United States Patent
Endo et al.

(10) Patent No.: US 9,652,342 B2
(45) Date of Patent: May 16, 2017

(54) REDUNDANCY PROCESSING METHOD AND SYSTEM, AND INFORMATION PROCESSING APPARATUS THEREOF

(71) Applicant: FUJITSU LIMITED, Kawasaki-shi, Kanagawa (JP)

(72) Inventors: Tomotaka Endo, Yokohama (JP); Hideyuki Matsuda, Kanagawa (JP); Yu Minakuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 14/640,325

(22) Filed: Mar. 6, 2015

(65) Prior Publication Data

US 2015/0254139 A1    Sep. 10, 2015

(30) Foreign Application Priority Data

Mar. 10, 2014    (JP) .................................. 2014-046073

(51) Int. Cl.
*G06F 11/00*    (2006.01)
*G06F 11/20*    (2006.01)

(52) U.S. Cl.
CPC ...... *G06F 11/2035* (2013.01); *G06F 11/2048* (2013.01); *G06F 11/2097* (2013.01)

(58) Field of Classification Search
CPC ............. G06F 11/2035; G06F 11/2048; G06F 11/2097; G06F 11/2023; G06F 11/2033
See application file for complete search history.

(56) References Cited

U.S. PATENT DOCUMENTS

| | | | |
|---|---|---|---|
| 9,128,899 B1 * | 9/2015 | McAlister | ............. G06F 11/203 |
| 2005/0015657 A1 | 1/2005 | Sugiura et al. | |
| 2012/0311376 A1 * | 12/2012 | Taranov | ............ G06F 17/30578 714/4.11 |
| 2013/0227335 A1 * | 8/2013 | Dake | ................... G06F 11/0709 714/4.2 |
| 2014/0101320 A1 * | 4/2014 | Endo | ....................... H04L 47/78 709/226 |
| 2014/0201564 A1 * | 7/2014 | Jagtiani | ................. G06F 11/203 714/4.11 |

FOREIGN PATENT DOCUMENTS

| | | |
|---|---|---|
| JP | 09-081409 | 3/1997 |
| JP | 2005-018510 | 1/2005 |
| JP | 2011-186637 | 9/2011 |
| WO | WO 2012/176337 A1 | 12/2012 |

* cited by examiner

*Primary Examiner* — Philip Guyton
(74) *Attorney, Agent, or Firm* — Staas & Halsey LLP

(57) ABSTRACT

In this method, a first information processing apparatus in a first system identifies a second system that performs a first processing on behalf of the first system when an abnormality occurs in the first system, and transmits a first request that includes data concerning resources used to perform the first processing to a second information processing apparatus in the second system. Upon detecting an abnormality in the second system, the first information processing apparatus identifies a third system other than the second system, transmits a second request that includes data concerning resources used to perform the first processing to a third information processing apparatus in the third system, and transmits a third request to release resources secured for the first system to the second information processing apparatus in the second system, upon detecting return of the second system.

10 Claims, 27 Drawing Sheets

FIG.3

| USER OF EMPOWERMENT SOURCE | ICS OF EMPOWERMENT DESTINATION | ADDRESS OF EMPOWERMENT DESTINATION | UPDATE RESULT | SERVICE PROVIDING STATE | RECOVERY EXECUTION TIME | RESOURCES | | CANDIDATES OF EMPOWERMENT DESTINATION |
|---|---|---|---|---|---|---|---|---|
| ICS1User01 | ICS2 | http://ics2/ | OK | WAITING | RECOVERY EXECUTION TIME | LINE TYPE (VPN), BANDWIDTH (100Mbps), ETC. | STORAGE (5GB), CPU RESOURCE AMOUNT (8GHz, 8 CORES), ETC. | ICS1 ICS2 ICS3 |
| ... | ... | ... | ... | ... | ... | ... | | ... |

| ICS OF EMPOWERMENT DESTINATION | USER OF EMPOWERMENT SOURCE | ADDRESS OF EMPOWERMENT SOURCE | PERIODICAL RESULT | RESOURCES | | CANDIDATES OF EMPOWERMENT DESTINATION |
|---|---|---|---|---|---|---|
| ICS1 | ICS1User01 | http://ics1/user01/ | OK/NG | LINE TYPE (VPN), BANDWIDTH (100Mbps), ETC. | | ICS1 ICS2 ICS3 |
| | | | | STORAGE (5GB), CPU RESOURCE AMOUNT (8GHz, 8 CORES), ETC. | | |
| ICSx | ICSxUseryy | http://icsx/useryy/ | OK/NG | LINE TYPE (VPN), BANDWIDTH (100Mbps), ETC. | | ICS3 ICS1 ICS2 |
| | | | | STORAGE, CPU RESOURCE AMOUNT ETC. | | |
| ... | ... | ... | ... | ... | | ... |

FIG.4

| CONNECTION DESTINATION | USED RESOURCES | EXPLANATION |
|---|---|---|
| ICS NAME (IDENTIFIER) | USED DC RESOURCES | STORAGE BEING USED, CPU RESOURCE AMOUNT, ETC. |

| CONNECTION DESTINATION | USED RESOURCES | EXPLANATION |
|---|---|---|
| ICS NAME (IDENTIFIER) | USED NW RESOURCES | LINE TYPE BEING USED, BANDWIDTH, ETC. |

| CONNECTION DESTINATION | USED RESOURCES | EXPLANATION |
|---|---|---|
| USER NAME (USER IDENTIFIER) | USED NW RESOURCES | LINE TYPE BEING USED, BANDWIDTH, ETC. |
| | USED DC RESOURCES | STORAGE BEING USED, CPU RESOURCE AMOUNT, ETC. |
| ⋮ | ⋮ | ⋮ |

| USER OF EMPOWERMENT SOURCE | ICS OF EMPOWERMENT DESTINATION | ADDRESS OF EMPOWERMENT DESTINATION | UPDATE RESULT | SERVICE PROVIDING STATE | RECOVERY EXECUTION TIME | RESOURCES | | CANDIDATES OF EMPOWERMENT DESTINATION |
|---|---|---|---|---|---|---|---|---|
| ICS1User01 | ICS2 | http://ics2/ | NG | WAITING | RECOVERY EXECUTION TIME | LINE TYPE (VPN), BANDWIDTH (100Mbps), ETC. | | ICS1 ICS2 ICS3 |
| | | | | | | STORAGE (5GB), CPU RESOURCE AMOUNT (8GHz, 8 CORES), ETC. | | |
| ICS1User01 | ICS3 | http://ics3/ | OK | WAITING | RECOVERY EXECUTION TIME | LINE TYPE (VPN), BANDWIDTH (100Mbps), ETC. | | ICS1 ICS2 ICS3 |
| | | | | | | STORAGE (5GB), CPU RESOURCE AMOUNT (8GHz, 8 CORES), ETC. | | |
| ... | ... | ... | ... | ... | ... | ... | | ... |

FIG.18

| ICS OF EMPOWERMENT DESTINATION | ADDRESS OF EMPOWERMENT DESTINATION | UPDATE RESULT | SERVICE PROVIDING STATE | RECOVERY EXECUTION TIME | RESOURCES | | CANDIDATES OF EMPOWERMENT DESTINATION |
|---|---|---|---|---|---|---|---|
| ICS3 | http://ics3/ | OK/UPDATE TIME | WAITING | RECOVERY EXECUTION TIME | LINE TYPE (VPN), BANDWIDTH (100Mbps), ETC. | | ICS1 ICS2 ICS3 |
| | | | | | STORAGE (5GB), CPU RESOURCE AMOUNT (8GHz, 8 CORES), ETC. | | |
| ... | ... | ... | ... | ... | ... | | ... |

FIG.26

REDUNDANCY PROCESSING METHOD AND SYSTEM, AND INFORMATION PROCESSING APPARATUS THEREOF

CROSS-REFERENCE TO RELATED APPLICATIONS

This application is based upon and claims the benefit of priority of the prior Japanese Patent Application No. 2014-046073, filed on Mar. 10, 2014, the entire contents of which are incorporated herein by reference.

FIELD

This invention relates to a redundancy technique of a system.

BACKGROUND

A certain document discloses a system for causing plural clouds to be cooperated. More specifically, a cloud cooperation server is provided in each cloud, and the cloud cooperation server of a primary cloud transmits management information concerning resources of the primary system to a cloud cooperation server in a secondary cloud in advance. Then, when the primary system becomes down, the cloud cooperation server of the secondary cloud secures resources based on the management information that has already been received, and then activates a secondary system on the secondary cloud.

This document discloses only simple switching of systems, and does not suppose a case where any trouble occurs in the secondary cloud while the primary system is operating in the primary cloud, or a case where the primary cloud returns after switching the system to the secondary system in the secondary cloud. Because such cases are not supposed, even when the availability of the system becomes high, a phenomenon that the extra resources are wastefully secured may occur.

Patent Document 1: International Publication Pamphlet No. WO 2012/176337

In other words, there is no conventional art for releasing resources that were secured for the redundancy early.

SUMMARY

A redundancy processing method relating to a first aspect of this invention includes: (A) identifying, by using a first information processing apparatus in a first system, a second system that performs a first processing on behalf of the first system when an abnormality occurs in the first system; (B) transmitting, by using the first information processing apparatus, a first request that includes data concerning resources used to perform the first processing to a second information processing apparatus in the second system; (C) upon detecting an abnormality in the second system, identifying, by using the first information processing apparatus, a third system other than the second system; (D) transmitting, by using the first information processing apparatus, a second request that includes data concerning resources used to perform the first processing to a third information processing apparatus in the third system; and (E) upon detecting return of the second system, transmitting, by using the first information processing apparatus, a third request to release resources secured for the first system to the second information processing apparatus in the second system.

A redundancy processing method relating to a second aspect of this invention includes: (A) identifying, by using a first information processing apparatus in a first system, a second system that performs a first processing on behalf of the first system when an abnormality occurs in the first system; (B) transmitting, by using the first information processing apparatus, a first request that includes data concerning resources used to perform the first processing to a second information processing apparatus in the second system; (C) after the abnormality in the first system is detected, identifying, by using the second information processing apparatus, a third system that performs the first processing on behalf of the first and the second systems when an abnormality occurs in the second information processing apparatus; (D) transmitting, by using the second information processing apparatus, a second request that includes data concerning resources used to perform the first processing to a third information processing apparatus in the third system; and (E) upon detecting that the first system returns and the first processing is returned to the first system, transmitting, by using the second information processing apparatus, a third request to release resources that were secured for the first system to the third information processing apparatus in the third system.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting an example of first management information stored in a management information storage unit;

FIG. 4 is a diagram depicting an example of second management information stored in the management information storage unit;

FIG. 18 is a diagram depicting an example after changing the first management information stored in the management information storage unit;

FIG. 26 is a diagram depicting an example of the first management information stored in a management information storage unit in a cloud cooperation server of the second secondary cloud system;

DESCRIPTION OF EMBODIMENTS

[Embodiment 1]

Figure 1:
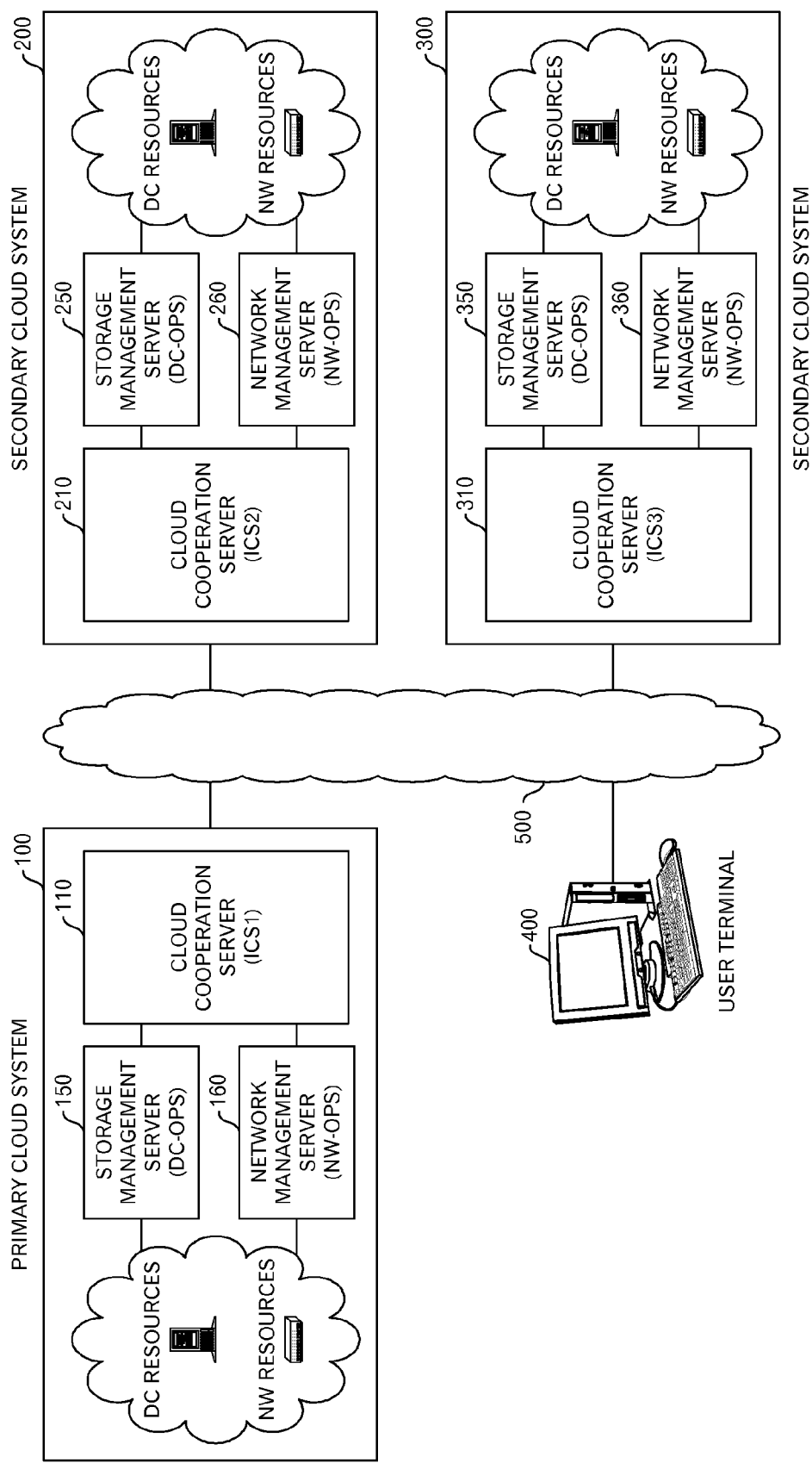
FIG. 1 is a diagram depicting an outline of a system relating to embodiments.

FIG. 1 illustrates an outline of a system relating to this embodiment.

In this embodiment, a primary cloud system 100, a first secondary cloud system 200, a second secondary cloud system 300 and a user terminal 400 of a user who constructs a system in the primary cloud system 100 are connected to a network 500 such as the Internet.

The primary cloud system 100 is a primary system for the user who operates the user terminal 400, however, the secondary cloud system 200 or 300 may be a primary system for other users.

The primary cloud system 100 has a storage management server (also called "a Data Center Operation System (DC-OPS)") 150, a network management server (also called "a Network Operation System (NW-OPS)") 160, a cloud cooperation server (also called "an Inter Cloud Server (ICS)") 110 and various kinds of resources. The various kinds of resources include CPU (Central Process unit) resources and storage resources (hereinafter, also referred to DC resources), and network resources including a line type, bandwidth and the like (hereinafter, also referred to NW resources).

Similarly, the secondary cloud system 200 also has a storage management server (also called "a DC-OPS") 250, a network management server (also called "a NW-OPS") 260, a cloud cooperation server (ICS) 210 and various kinds of resources.

Furthermore, the secondary cloud system 300 also has a storage management server (also called "a DC-OPS") 350, a network management server (also called "a NW-OPS") 360, a cloud cooperation server (ICS) 310 and various kinds of resources.

As described above, the primary cloud system 100 may also operate as a secondary cloud system, and the secondary cloud systems 200 and 300 may also operate as a primary cloud system. Therefore, basically, the cloud cooperation servers in these cloud systems have the similar configuration, the storage management servers in these cloud systems have the similar configuration, and the network management servers in these cloud systems have the similar configuration.

Figure 2:
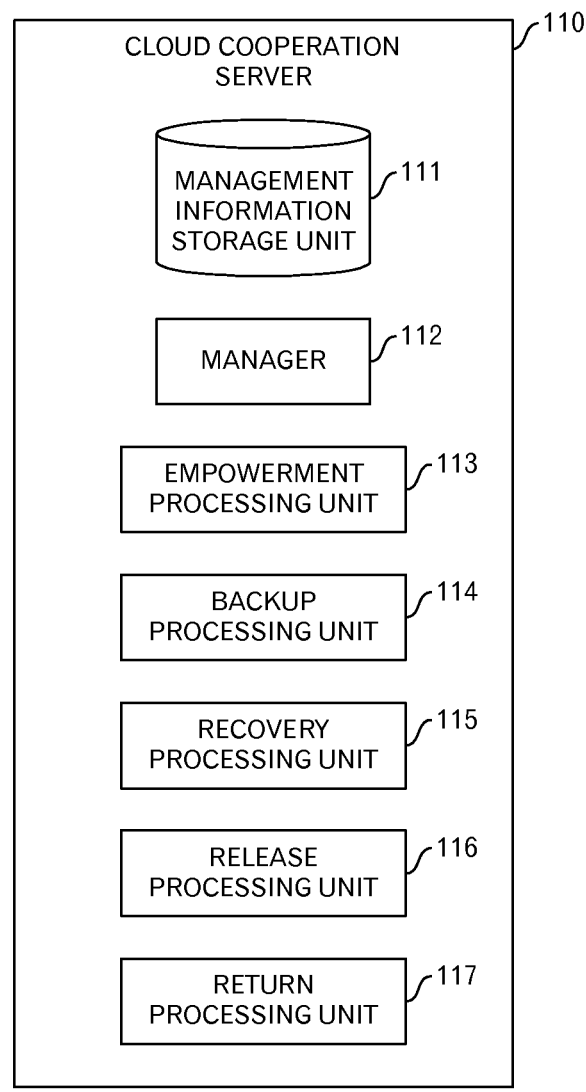
FIG. 2 is a functional block diagram of a cloud cooperation server.

Then, a configuration example of the cloud cooperation server 110 in the primary cloud system 100 will be explained by using FIG. 2.

The cloud cooperation server 110 has a management information storage unit 111, a manager 112, an empowerment processing unit 113, a backup processing unit 114, a recovery processing unit 115, a release processing unit 116 and a return processing unit 117.

The management information storage unit 111 stores first management information concerning the primary system constructed on its own cloud system and second management information concerning the secondary system empowered for the recovery start from other clouds.

FIG. 3 illustrates an example of the first management information stored in the management information storage unit 111 of the cloud cooperation server 110 in the primary cloud system 100. In an example of FIG. 3, a user ID of a user of an empowerment source, which represents a user of the primary system, an ID of an ICS that is an empowerment destination, which represents a cloud cooperation server of the secondary cloud system that is the empowerment destination, an address of the empowerment destination, an update result that represents whether or not there is a response to an empowerment request (including an update date and time), a service providing state of the empowerment destination (waiting/in service), a recovery execution time that is notified in case where the recovery is performed in the secondary cloud system, resources secured in the secondary cloud system and a list of candidates of the empowerment destination for the recovery start.

As for the resources to be secured, the DC resource and the NW resource are separately set by the user of the user terminal 400, for example.

In the list of candidates of the empowerment destination for the recovery start, the primary cloud system is listed in the top, for example, and the secondary cloud systems that are preferable to perform the recovery are listed in order of the preference. Here, the first is ICS1, in other words, the primary cloud system 100 is primary, the second is ICS2, in other words, the secondary cloud system 200, and the third is ICS3, in other words, the secondary cloud system 300. Instead of such a list, the list of candidates may be a rule to identify the secondary cloud system of the empowerment destination for the recovery start.

The recovery execution time is notified from the secondary cloud system that performed the recovery.

On the other hand, an example of the second management information stored in the management information storage unit of the cloud cooperation server 210 in the secondary cloud system 200 is illustrated in FIG. 4. In an example of FIG. 4, an ID of an ICS that is an empowerment source, which represents a cloud system that is the empowerment source of the recovery start, an ID of a user of the empowerment source, an address of the empowerment source, a periodical result that represents whether or not the management information can be obtained periodically, resources to be secured, and a list of candidates of the empowerment destination for the recovery start.

As described below, the management information is periodically transmitted from the cloud cooperation server in the cloud system of the empowerment source. Therefore, when the management information can be obtained periodically, the periodical result becomes "OK" and when the management information cannot be obtained periodically, the periodical result becomes "NG". The resources and candidates of the empowerment destinations are basically received from the cloud cooperation server of the empowerment source.

Data as illustrated in FIGS. 3 and 4 is stored in each of the primary cloud system and secondary cloud system.

Figures 5, 6:
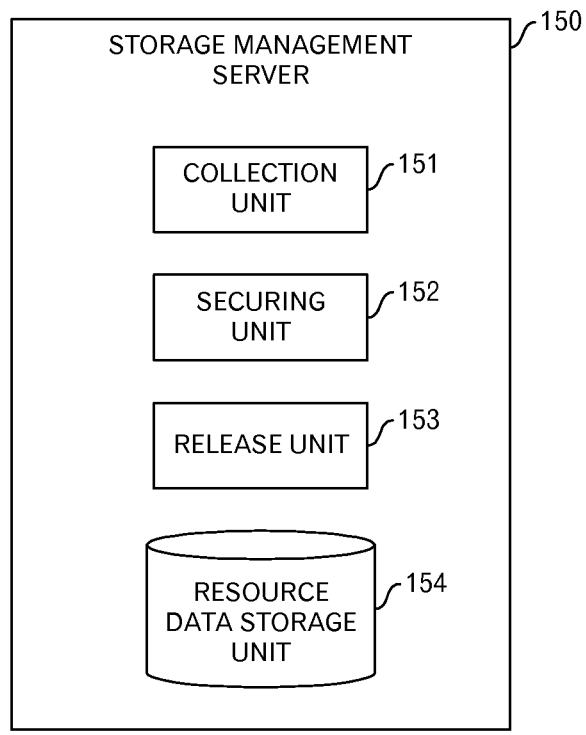
FIG. 5 is a functional block diagram of a storage management server.
FIG. 6 is a diagram depicting a format example of data stored in a resource data storage unit in the storage management server.

Moreover, as illustrated in FIG. 5, the storage management server 150 has a collection unit 151, a securing unit 152, a release unit 153 and a resource data storage unit 154. The collection unit 151 collects data of the DC resources used in the system constructed in the cloud system, and stores the collected data in the resource data storage unit 154. Moreover, the collection unit 151 also collects, for each user, data of the DC resources being used, and transmits the collected data to the cloud cooperation server 110.

The securing unit 152 performs a processing to secure the DC resource in response to a request from the cloud cooperation server 110. In this embodiment, the securing unit 152 also performs a backup processing and the like. Furthermore, the release unit 153 performs a processing to release the DC resources that were secured in response to a request from the cloud cooperation server 110.

FIG. 6 illustrates a format example of data stored in the resource data storage unit 154. In an example of FIG. 6, an ICS name (i.e. identifier) of a connection destination and data of the DC resources that are being used (storage, CPU resource amount and the like) are stored. Because there is a case where the primary cloud system 100 provides resources for other cloud systems, data is held for each ICS of the connection destination. However, data of the DC resource may be held for each user.

Figures 7, 8, 9:
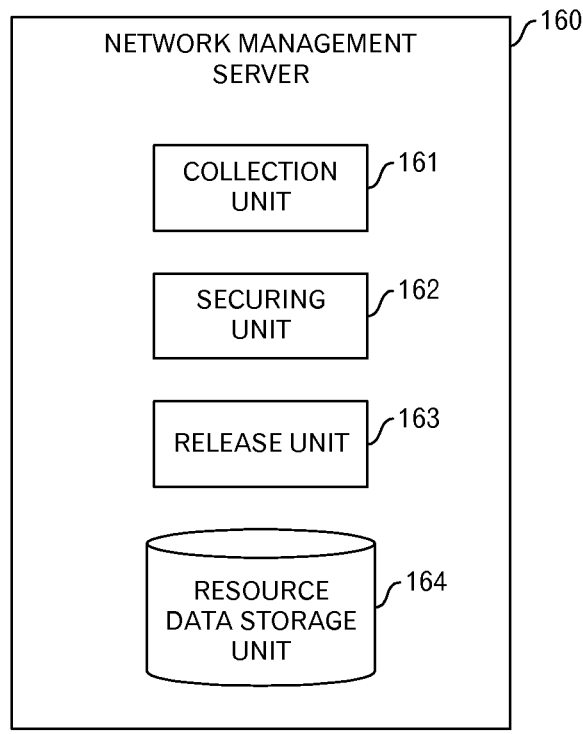
FIG. 7 is a functional block diagram of a network management server.
FIG. 8 is a diagram depicting a format example of data stored in a resource data storage unit of the network management server.
FIG. 9 is a diagram depicting an example of resource data stored in the management information storage unit.

Moreover, as illustrated in FIG. 7, the network management server 160 has a collection unit 161, a securing unit 162, a release unit 163 and a resource data storage unit 164. The collection unit 161 collects data of the NW resource used in the system that is constructed in the cloud system, and stores the collected data in the resource data storage unit 164. Moreover, the collection unit 161 also collects data of the NW resource for each user, and transmits the collected data to the cloud cooperation server 110.

The securing unit 162 performs a processing to secure the NW resources in response to a request from the cloud cooperation server 110. Furthermore, the release unit 163 performs a processing to release the NW resources that were secured, in response to a request from the cloud cooperation server 110.

FIG. 8 illustrates a format example of data stored in the resource data storage unit 164. In an example of FIG. 8, an ICS name (i.e. identifier) of a connection destination and data of the NW resource that is being used (line type, bandwidth and the like) are stored. When there is a case where the primary cloud system 100 provides resources for other cloud systems, data is held for each ICS of the connection destination. However, data of the NW resources may be held for each user.

Data of the resources, which is collected by the collection unit 151 of the storage management server 150 and the collection unit 161 of the network management server 160, is transmitted to the manager 112 of the cloud cooperation server 110. Then, the management information storage unit 111 stores the resource data in the format as illustrated in FIG. 9. In an example of FIG. 9, a connection destination (a user name (i.e. user identifier)) and data of the NW resources that are being used and the DC resources that are being used are included. Hence, it becomes possible to identify resources to be secured when the backup is performed in another cloud system, for example.

Figure 10:
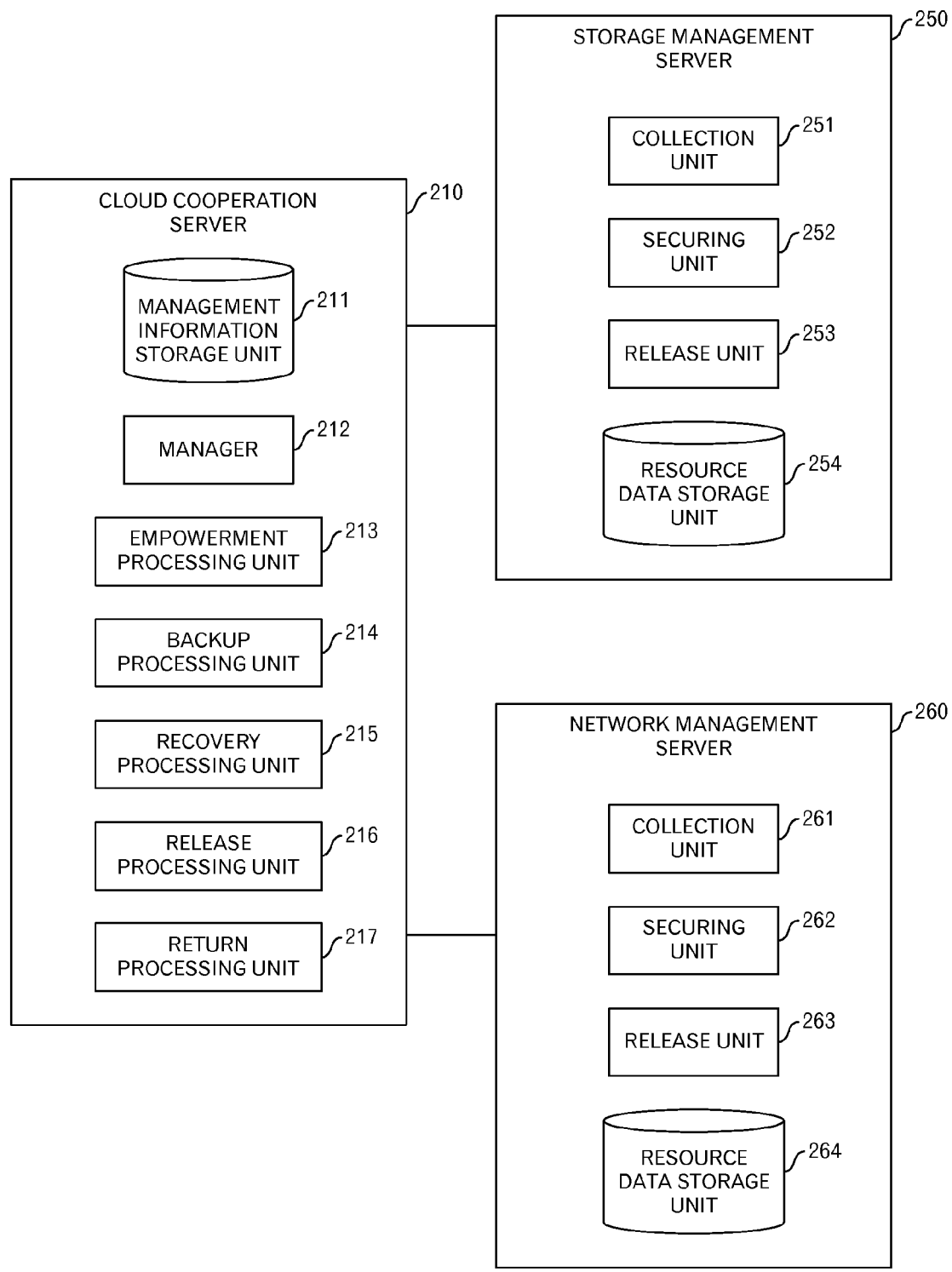
FIG. 10 is a diagram depicting a configuration of a first secondary cloud system.
Figure 11:
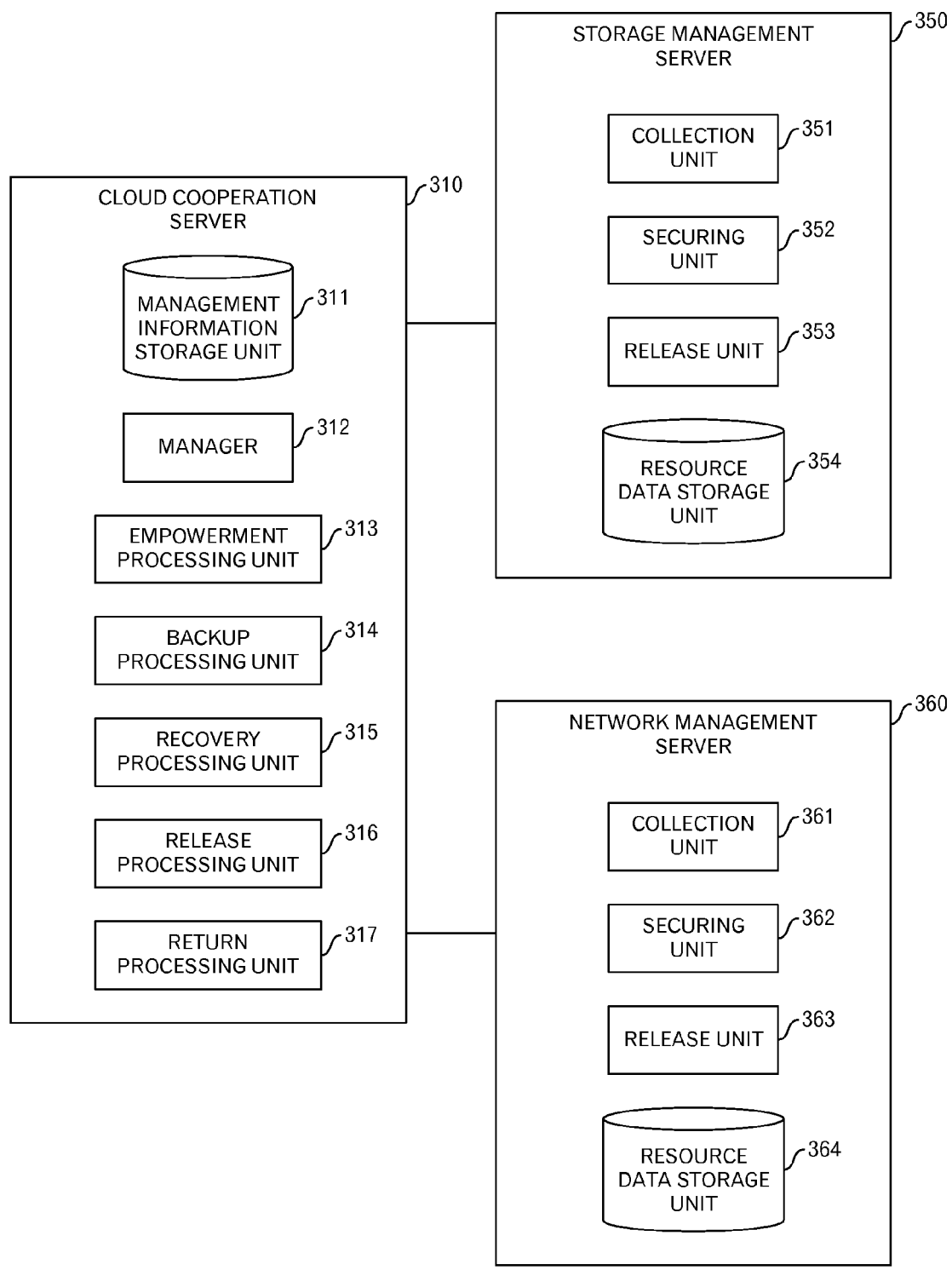
FIG. 11 is a diagram depicting a configuration of a second secondary cloud system.

Because elements in the secondary cloud systems 200 and 300 will also be described in the following explanation, reference numbers as illustrated in FIGS. 10 and 11 are attached in order to distinguish them.

In other words, the cloud cooperation server 210 has a management information storage unit 211, a manager 212, an empowerment processing unit 213, a backup processing unit 214, a recovery processing unit 215, a release processing unit 216 and a return processing unit 217. The storage management server 250 has a collection unit 251, a securing unit 252, a release unit 253, and a resource data storage unit 254. Furthermore, the network management server 260 has a collection unit 261, a securing unit 262, a release unit 263 and a resource data storage unit 264.

Moreover, the cloud cooperation server 310 has a management information storage unit 311, a manager 312, an empowerment processing unit 313, a backup processing unit 314, a recovery processing unit 315, a release processing unit 316 and a return processing unit 317. The storage management server 350 has a collection unit 351, a securing unit 352, a release unit 353, and a resource data storage unit 354. Furthermore, the network management server 360 has a collection unit 361, a securing unit 362, a release unit 363 and a resource data storage unit 364.

Figure 12:
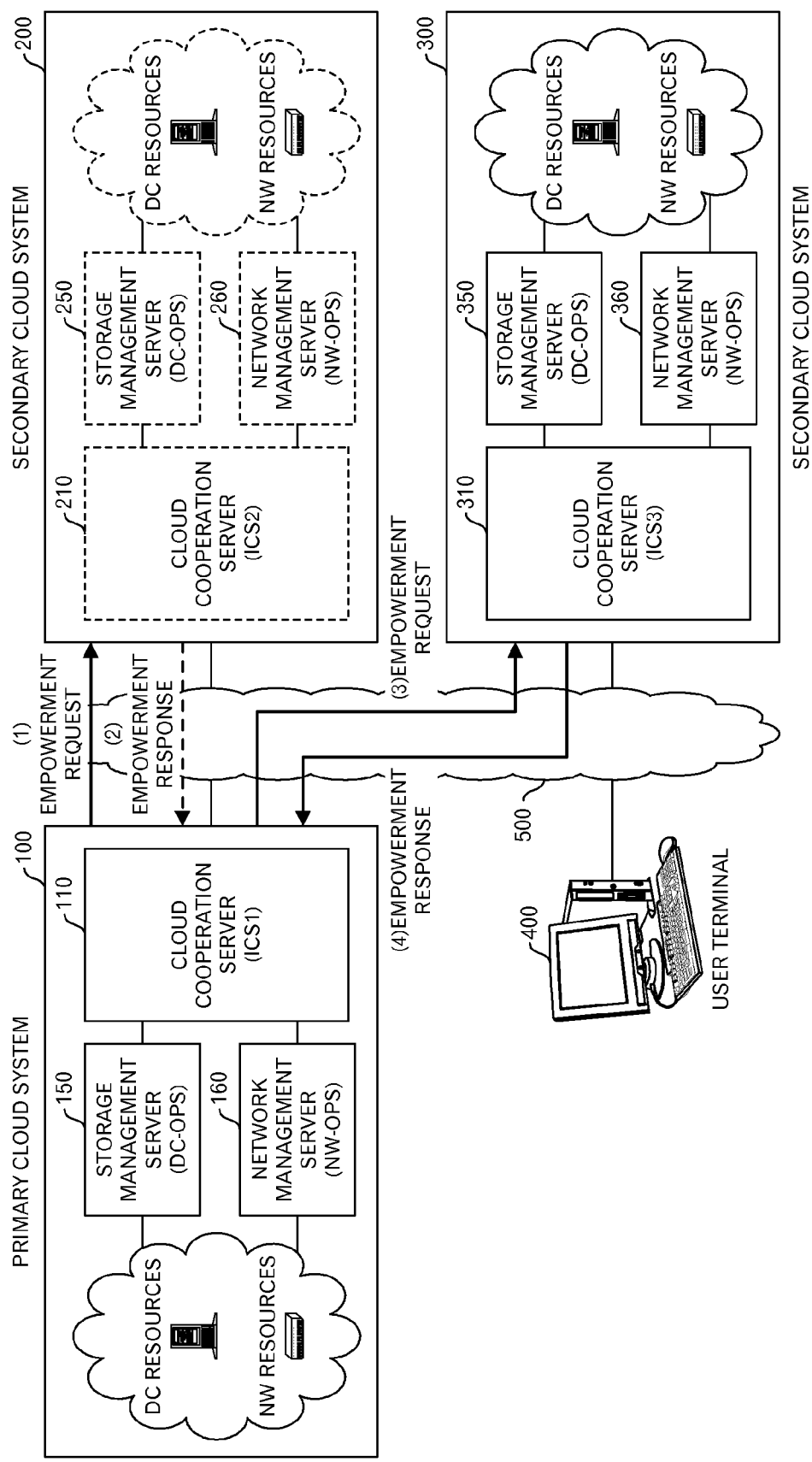
FIG. 12 is a diagram to explain an outline of a processing relating to a first embodiment.

Next, an outline of a processing relating to this embodiment will be explained by using FIGS. 12 and 13. Firstly, it is assumed that the secondary cloud system 200 (i.e. ICS2) is specified as an empowerment destination for the recovery start for a system of a certain user (i.e. ICS1User01 in FIG. 3). Then, the cloud cooperation server 110 of the primary cloud system 100 transmits an empowerment request including management information that includes an ID (i.e. identifier) of an ICS that is the empowerment source, a user ID of the empowerment source, data concerning resources to be secured and a list of candidates of the empowerment destination to the cloud cooperation server 210 of the secondary cloud system 200. When there is no failure or trouble in the secondary cloud system 200, the cloud cooperation server 210 of the secondary cloud system 200 stores management information which is included in the empowerment request, in the management information storage unit 211, and transmits an empowerment response to the empowerment request back to the cloud cooperation server 110 of the primary cloud system 100.

After such a transaction was performed once or more, even when the cloud cooperation server 110 transmits the empowerment request to the cloud cooperation server 210 (step (1)), it is assumed that the cloud cooperation server 210 does not transmit the empowerment response back to the cloud cooperation server 110 (step (2)).

Then, the cloud cooperation server 110 determines that a failure or the like occurred in the secondary cloud system 200, and transmits the empowerment request to the cloud cooperation server 310 of the secondary cloud system 300, which is designated in the next turn in the list of candidates of the empowerment destination (step (3)).

In response to this, the cloud cooperation server 310 of the secondary cloud system 300, which is operating normally, stores the management information included in the empowerment request in the management information storage unit 311, and transmits back the empowerment response (step (4)). After this, the cloud cooperation server 110 of the primary cloud system 100 transmits a backup start request to the cloud cooperation server 310 of the secondary cloud system 300 to cause the cloud cooperation server 310 to perform the backup.

Figure 13:
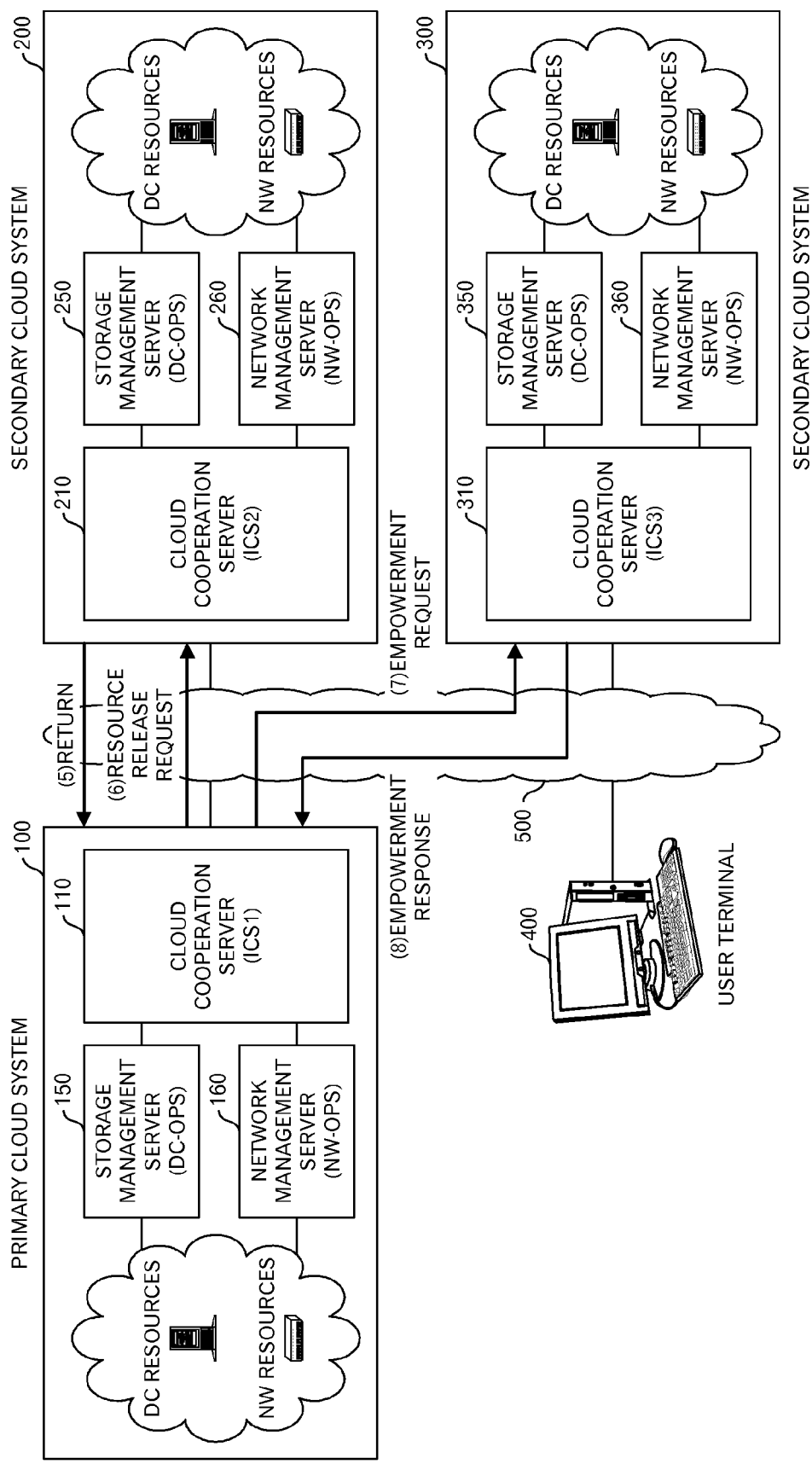
FIG. 13 is a diagram to explain the outline of the processing relating to the first embodiment.

After that, as illustrated in FIG. 13, the secondary cloud system 200 returns, and its cloud cooperation server 210 notifies the cloud cooperation server 110 of the primary cloud system 100 of the return by a hear beat, for example (step (5)).

However, because the empowerment request has already been sent to the secondary cloud system 300 and the empowerment response has been received, the secondary cloud system 200 is in a state that the secondary cloud system 200 ceases to perform the recovery. Then, the cloud cooperation server 110 of the primary cloud system 100 transmits a resource release request to the cloud cooperation server 210 of the secondary cloud system 200 (step (6)). At this step, by early releasing the resources in the secondary cloud system 200, the resources of the secondary cloud system 200 is effectively utilized. In addition, the management information is also deleted. Thus, the inconsistency of the processing is prevented in the entire system.

The cloud cooperation server 110 continues an operation to transmit the empowerment request to the cloud cooperation server 310 of the secondary cloud system 300 (step (7)).

In response to this empowerment request, the cloud cooperation server 310 of the secondary cloud system 300, which is normally operating, transmits back the empowerment response (step (8)).

In the following, processing contents of such an operation pattern will be explained in detail by using FIGS. 14 to 21.

Figure 14:
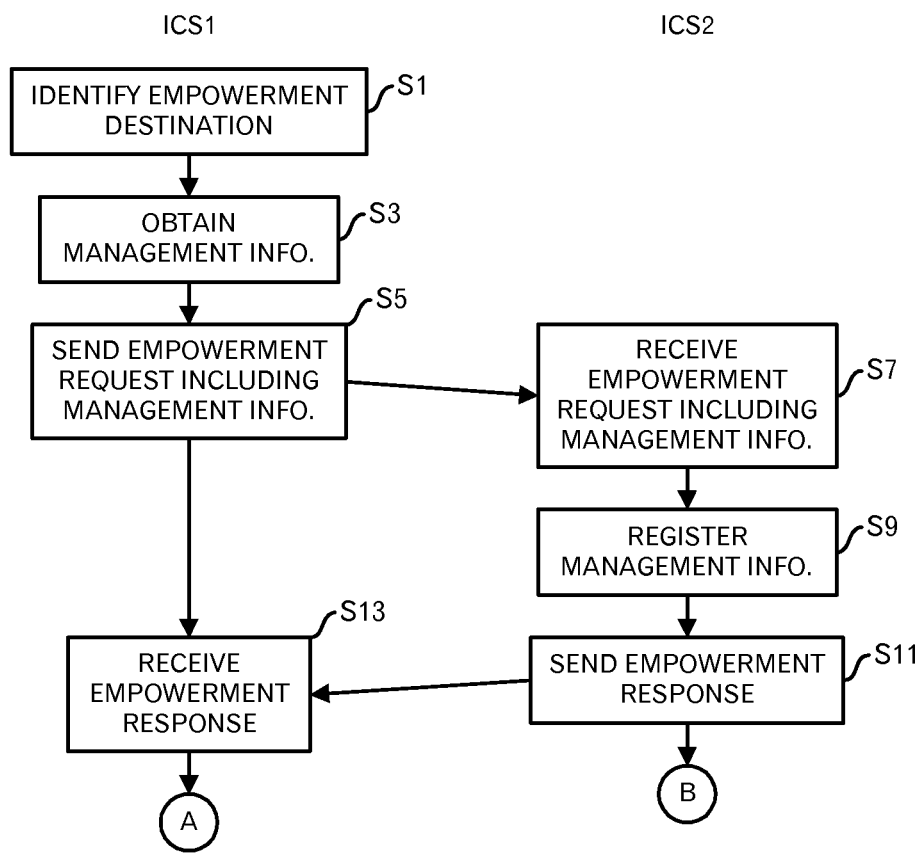
FIG. 14 is a diagram to explain a processing flow of the processing relating to the first embodiment.

Firstly, the empowerment processing unit 113 in the cloud cooperation server 110 (ICS1) of the primary cloud system 100 selects, based on data stored in the management information storage unit 111, a higher-ranked cloud system other than its own cloud system from the list of candidates of the empowerment destination for the system of the certain user to identify the empowerment destination (FIG. 14: step S1). In the example of FIG. 3, the secondary cloud system 200 is identified firstly.

Moreover, the empowerment processing unit 113 reads out the management information to be attached to the empowerment request from the management information storage unit 111 (step S3). As described above, the management information includes the ID (i.e. identifier) of the ICS that is the empowerment source, the user ID of the empowerment source, data of the resources to be secured and the list of candidates of the empowerment destination.

Then, the empowerment processing unit 113 transmits the empowerment request including the management information to the cloud cooperation server 210 (i.e. ICS2) of the secondary cloud system 200 (step S5). In response to this, the empowerment processing unit 213 of the cloud cooperation server 210 (i.e. ICS2) receives the empowerment request including the management information from the primary cloud system 100 (step S7), and registers the received management information in the management information storage unit 211 (step S9). Data as illustrated in FIG. 4 is stored. The periodical result becomes "OK" in the existing circumstances.

Then, the empowerment processing unit 213 of the cloud cooperation server 210 (i.e. ICS2) transmits the empowerment response to the cloud cooperation server 110 of the primary cloud system 100 (step S11).

In response to this, the empowerment processing unit 113 of the cloud cooperation server 110 receives the empowerment response from the cloud cooperation server 210 of the secondary cloud system 200 (step S13). Then, as illustrated in FIG. 3, the empowerment processing unit 113 sets data of the secondary cloud system 200 as the ID of the ICS that is the empowerment destination and the address of the empowerment destination in the management information storage unit 111, and sets "OK" and the receipt time of the empowerment response as the update result, and sets "waiting" as the service providing state. Then, the processing shifts to a processing in FIG. 15 through terminals A and B.

The steps S5 to S13 are performed, for example, periodically. However, the cloud cooperation server 210 updates data stored in the management information storage unit 211 when the management information is updated.

Figure 15:
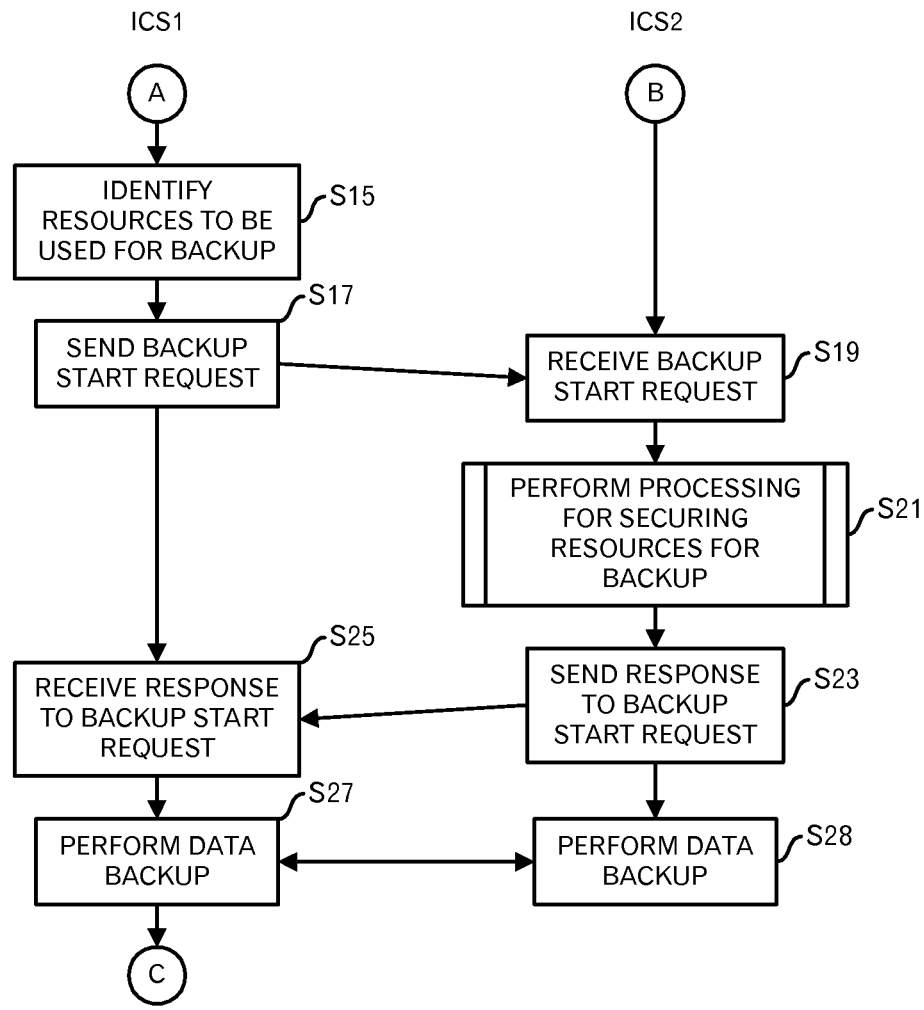
FIG. 15 is a diagram to explain the processing flow of the processing relating to the first embodiment.
Figure 16:
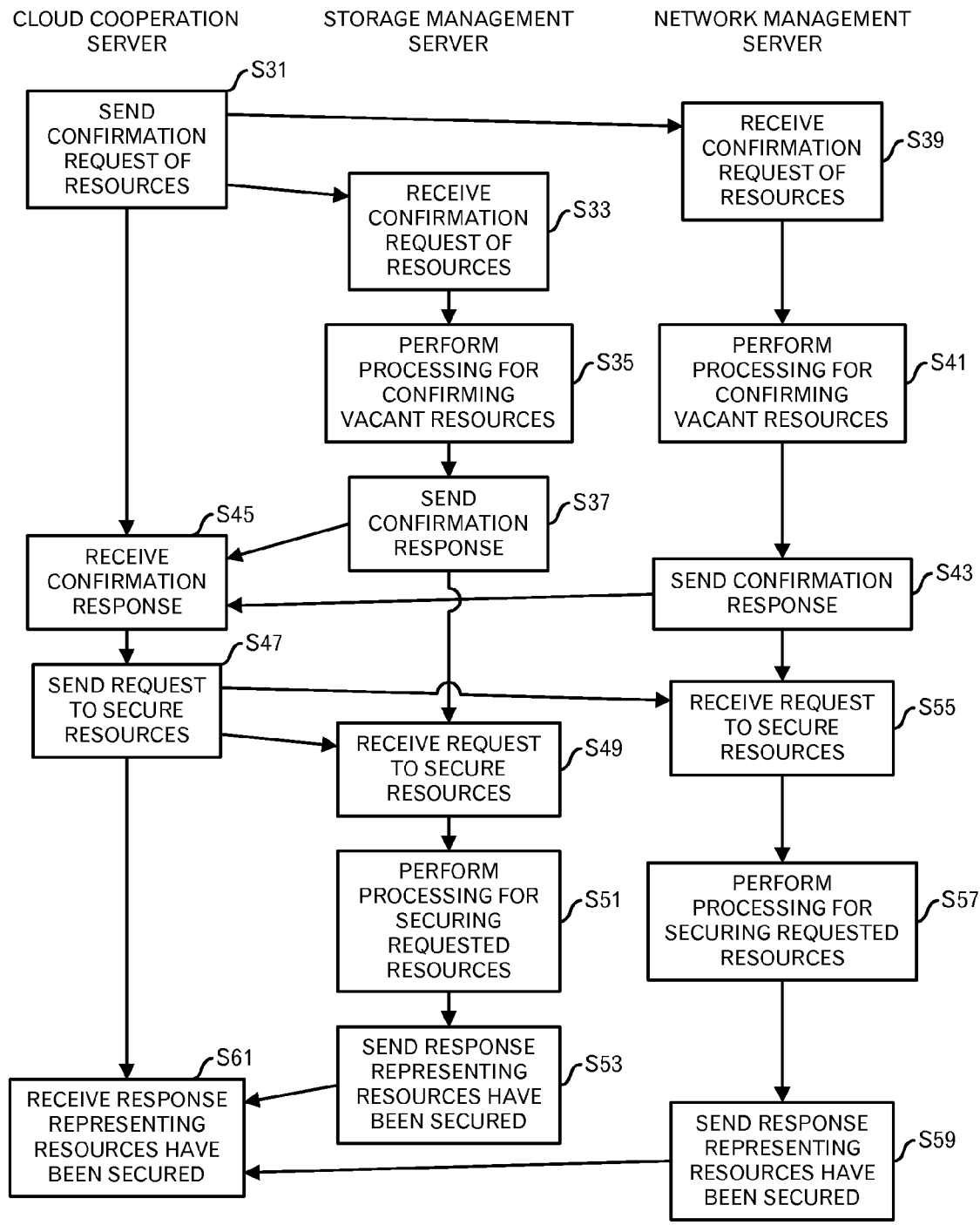
FIG. 16 is a diagram depicting a processing flow of a processing for securing resources.

Shifting to the explanation of the processing in FIG. 15, the backup processing unit 114 of the cloud cooperation server 110 next identifies resources to be used for the backup from the resource data (FIG. 9) stored in the management information storage unit 111 (step S15). For example, a storage amount to be secured for the backup is identified from the storage amount that is being used. For example, a CPU amount and network resources, which are typically used when the backup is performed, are identified.

Then, the backup processing unit 114 transmits a backup start request including data of the resources to be secured for the backup to the cloud cooperation server 210 of the secondary cloud system 200 (step S17).

In response to this, the backup processing unit 214 in the cloud cooperation server 210 of the secondary cloud system 200 receives the backup start request including the data of the resources to be secured from the cloud cooperation server 110 of the primary cloud system 100 (step S19).

Then, the secondary cloud system 200 performs a resource securing processing for the backup (step S21). This resource securing processing will be explained by using FIG. 16.

The backup processing unit 214 of the cloud cooperation server 210 generates, from the data of the resources, which is included in the received backup start request, and transmits a confirmation request of the DC resources to be secured for the backup to the storage management server 250. And the backup processing unit 214 generates, from the same data of the resources, and transmits a confirmation request of the NW resource to be secured for the backup to the network management server 260 (step S31).

In response to this, the securing unit 252 of the storage management server 250 receives the confirmation request of the DC resource (step S33), and performs a processing to confirm vacant resource (step S35). There is no problem when an amount of vacant resources is equal to or greater than a requested amount of resources, however, this processing is the same as the conventional art, and is not the main portion of the embodiment. Therefore, further explanation is omitted. When the amount of vacant resources is less than the requested amount of resources, substitute resources are secured from other cloud systems, for example. However, the securing the substitute resources is also the same as the conventional arts, and is not the main portion of this embodiment. Therefore, further explanation is omitted. Then, the securing unit 252 transmits a confirmation response to the effect that the DC resources to be secured for the backup can be secured to the backup processing unit 214 of the cloud cooperation server 210 (step S37).

Similarly, the securing unit 262 of the network management server 260 receives the confirmation request of the NW resource (step S39), and performs a processing to confirm vacant resources (step S41). There is no problem when an amount of vacant resources is equal to or greater than a requested amount of resources, however, this processing is the same as the conventional art, and is not the main portion of the embodiment. Therefore, further explanation is omitted. When the amount of vacant resources is less than the requested amount of resources, substitute resources are secured from other cloud systems, for example. However, the securing the substitute resources is also the same as the conventional arts, and is not the main portion of this embodiment. Therefore, further explanation is omitted. Then, the securing unit 262 transmits a confirmation response to the effect that the NW resource to be secured for the backup can be secured to the backup processing unit 214 of the cloud cooperation server 210 (step S43).

When the backup processing unit 214 of the cloud cooperation server 210 receives the confirmation response from the storage management server 250 and the network management server 260 (step S45), the backup processing unit 214 transmits a request to secure the DC resources to be secured for the backup to the storage management server 250, and transmits a request to secure the NW resource to be secured for the backup to the network management server 260 (step S47).

In response to this, the securing unit 252 of the storage management server 250 receives the request to secure the DC resources (step S49), and performs a processing to secure the requested resource (step S51). The processing to secure the requested resource is the same as the conventional art, and is not the main portion of this embodiment. Therefore, further explanation is omitted. Then, the securing unit 252 transmits a response to the effect that the DC resources to be secured for the backup have been secured to the backup processing unit 214 of the cloud cooperation server 210 (step S53).

Similarly, the securing unit 262 of the network management server 260 receives the request to secure the NW resource (step S55), and performs a processing to secure the requested resource (step S57). This processing to secure the requested resource is also the same as the conventional art, and is not the main portion of this embodiment. Therefore, further explanation is omitted. Then, the securing unit 262 transmits a response to the effect that the NW resource to be secured for the backup has been secured to the backup processing unit 214 of the cloud cooperation server 210 (step S59).

The backup processing unit 214 of the cloud cooperation server 210 receives the response to the effect that the resources have been secured from the storage management server 250 and the network management server 260 (step S61). Thus, the securing the resources has been completed.

When the resources for the recovery are secured, the recovery processing unit 215 causes the storage management server 250 and the network management server 260 to perform a processing to secure the resources.

Returning to the explanation of the processing in FIG. 15, the backup processing unit 214 of the cloud cooperation server 210 transmits a response to the backup start request to the backup processing unit 114 of the cloud cooperation server 110 (step S23). The backup processing unit 114 of the cloud cooperation server 110 receives a response to the backup start request from the cloud cooperation server 210 of the secondary cloud system 200 (step S25). Then, the backup processing unit 114 instructs the storage management server 150 to start the backup, and the storage management server 150 performs a backup processing with the storage management server 250 in the secondary cloud system 200 (steps S27 and S28). The specific contents of the backup processing are the same as that of the conventional art and are not the main portions of the embodiment. Therefore, further explanation will be omitted. After that, the processing shifts to a processing in FIG. 17 through terminal C.

Figure 17:
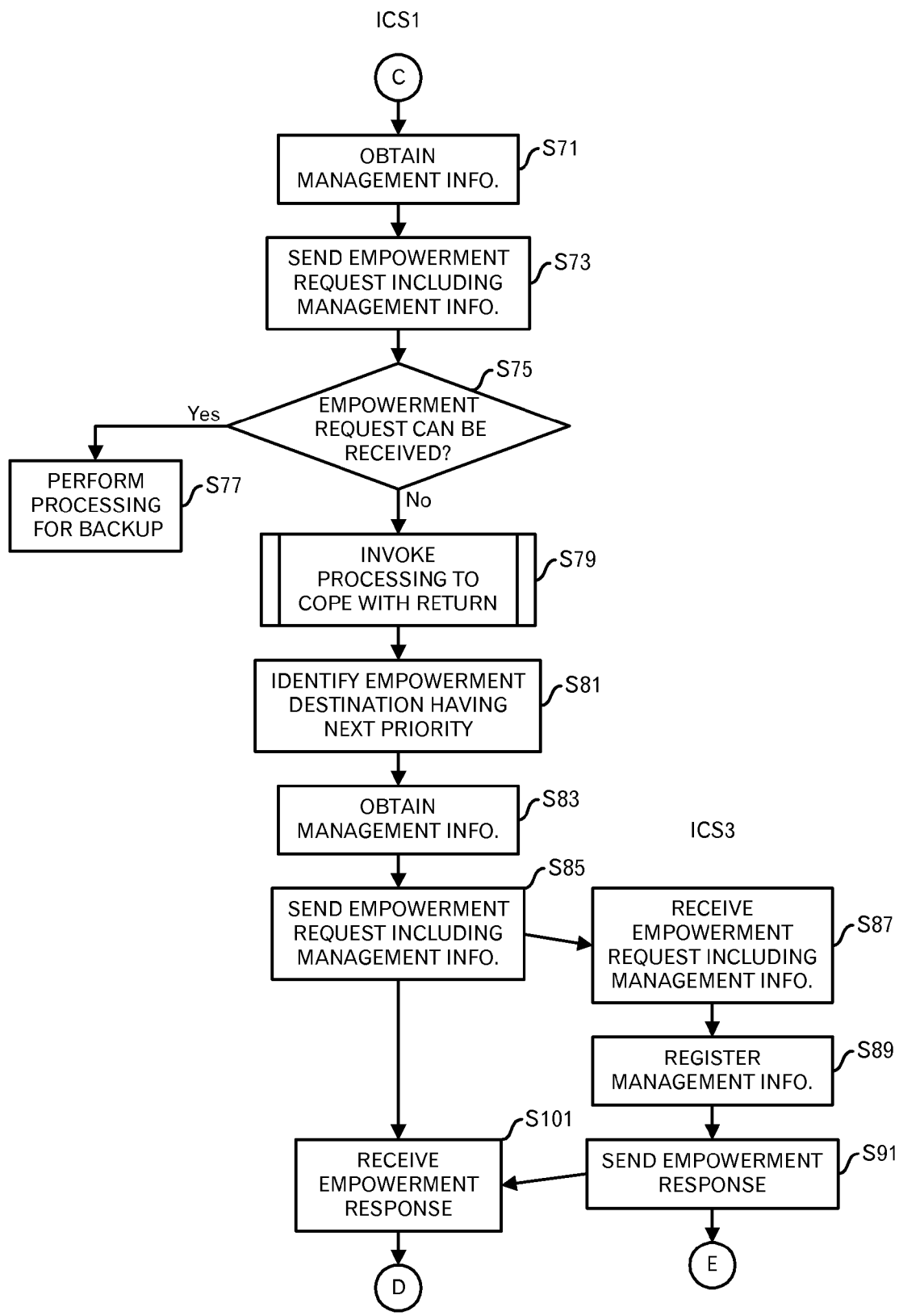
FIG. 17 is a diagram depicting a processing flow of the processing relating to the first embodiment.

Shifting to the explanation of a processing in FIG. 17, the empowerment processing unit 113 in the cloud cooperation server 110 (i.e. ICS1) of the primary cloud system 100 reads out data from the management information storage unit 111, to obtain management information to be attached to the empowerment request (step S71).

Then, the empowerment processing unit 113 transmits the empowerment request including the management information to the cloud cooperation server 210 (i.e. ICS2) of the secondary cloud system 200, which is the empowerment destination for the recovery start (step S73).

Here, it is assumed that the failure occurred in the secondary cloud system 200 and the secondary cloud system 200 cannot respond to the empowerment request.

Then, the empowerment processing unit 113 of the cloud cooperation server 110 cannot receive any empowerment response within a predetermined time period after transmitting the empowerment request, for example. When the empowerment processing unit 113 received the empowerment response from the cloud cooperation server 210 of the secondary cloud system 200 (step S75: Yes route), the backup processing unit 114 performs a processing for the backup (e.g. steps S17 to S28) (step S77). Here, the processing for the backup may be performed only when the transmitted management information is updated, or the processing for the backup may be performed for each transmission of the empowerment request.

On the other hand, in accordance with the aforementioned presupposition, when the empowerment response cannot be received within the predetermined time period (step S75: No route), the empowerment processing unit 113 of the cloud cooperation server 110 invokes a processing to cope with the return by the release processing unit 116 (step S79). This processing is a processing to wait until the secondary cloud system 200 that has been the empowerment destination returns, and to respond to the return when the secondary cloud system 200 actually returns. Therefore, this processing will be explained later. At this step, in the management information storage unit 111, the update result of the management information becomes "NG". "Down" may be set for the service providing state.

Moreover, the empowerment processing unit 113 identifies an empowerment destination by selecting a cloud system in the next priority to the secondary cloud system 200 from the list of candidates of the empowerment destination for the system of the certain user, based on the data stored in the management information storage unit 111 (step S81). In the example of FIG. 3, the secondary cloud system 300 is identified.

Moreover, the empowerment processing unit 113 reads out the management information to be attached to the empowerment request from the management information storage unit 111 (step S83).

Then, the empowerment processing unit 113 transmits the empowerment request including the management information to the cloud cooperation server 310 (i.e. ICS3) of the secondary cloud system 300 (step S85). In response to this, the empowerment processing unit 313 of the cloud cooperation server 310 (i.e. ICS3) receives the empowerment request including the management information from the primary cloud system 100 (step S87), and registers the received management information in the management information storage unit 311 (step S89). Data as illustrated in FIG. 4 is stored. The periodical result becomes "OK" in the current state.

Then, the empowerment processing unit 313 of the cloud cooperation server 310 (i.e. ICS3) transmits the empowerment response to the cloud cooperation server 110 of the primary cloud system 100 (step S91).

In response to this, the empowerment processing unit 113 of the cloud cooperation server 110 receives the empowerment response from the cloud cooperation server 310 of the secondary cloud system 300 (step S101). Then, as illustrated in FIG. 18, in the management information storage unit 111, data of the secondary cloud system 300 is set as the ID of the ICS that is the empowerment destination and the address of the empowerment destination, "OK" and the receipt time of the empowerment response are set as the update result of the management information, and "waiting" is set as the service providing state. Then, the processing shifts to a processing in FIG. 19 through terminals D and E.

Figure 19:
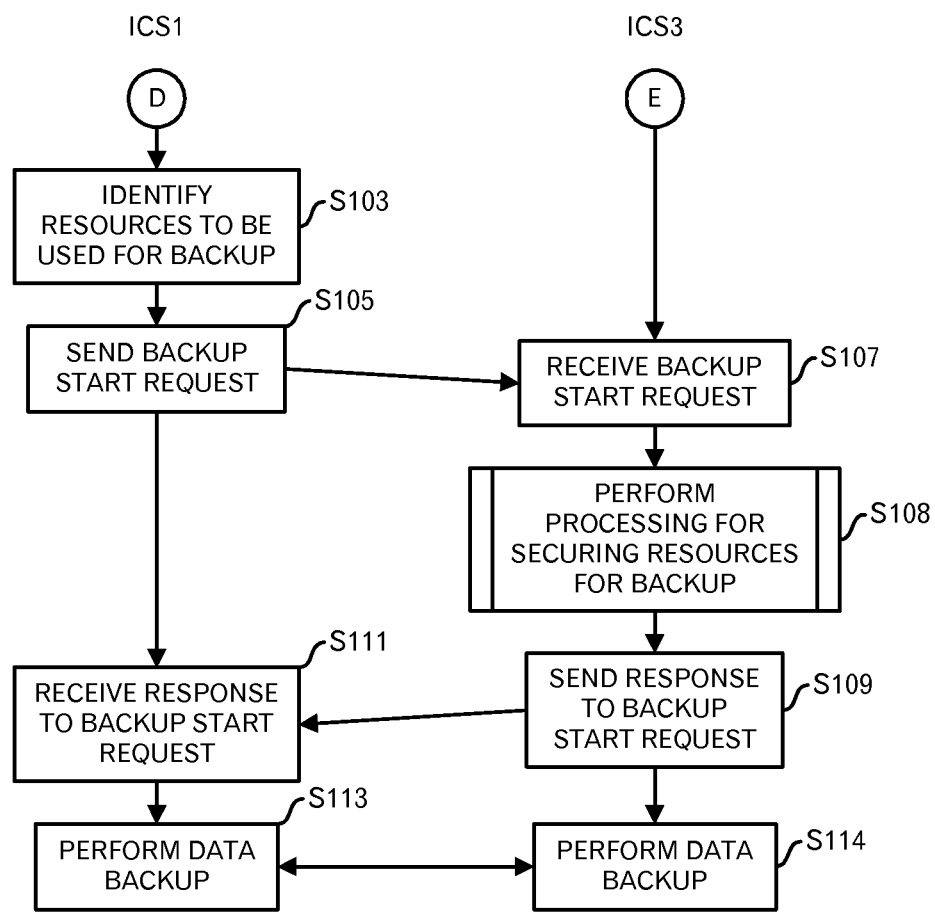
FIG. 19 is a diagram depicting a processing flow of the processing relating to the first embodiment.

Shifting to the explanation of a processing in FIG. 19, next, the backup processing unit 114 of the cloud cooperation server 110 identifies resources to be used for the backup from the resource data (FIG. 9) stored in the management information storage unit 111 (step S103). This step is the same as the step S15.

Then, the backup processing unit 114 transmits a backup start request including data of the resources to be secured for the backup to the cloud cooperation server 310 of the secondary cloud system 300 (step S105).

In response to this, the backup processing unit 314 in the cloud cooperation server 310 of the secondary cloud system 300 receives the backup start request including the data of the resources to be secured from the cloud cooperation server 110 of the primary cloud system 100 (step S107).

Then, the secondary cloud system 300 performs a processing for securing resources for the backup (step S108). This processing for securing resources for the backup is the same as that explained by using FIG. 16. However, the executor of this processing is the secondary cloud system 300 instead of the secondary cloud system 200.

After that, the backup processing unit 314 of the cloud cooperation server 310 transmits a response to the backup start request to the backup processing unit 114 of the cloud cooperation server 110 (step S109). The backup processing unit 114 of the cloud cooperation server 110 receives the response to the backup start request from the cloud cooperation server 310 of the secondary cloud system 300 (step S111). Then, the backup processing unit 114 instructs the storage management server 150 to start the backup, and the storage management server 150 performs the backup processing with the storage management server 350 in the secondary cloud system 300 (steps S113 and S114). The specific contents of the backup processing are the same as those in the conventional art, and are not main portions of the embodiment. Therefore, further explanation is omitted.

Thus, also in the secondary cloud system 300, the preparation of the recovery start is made.

Next, the processing for coping with the return will be explained by using FIG. 20.

In this embodiment, when the system returns from the failure, data of the empowerment source is read out, for example, from the management information storage unit, and notification of the system return is transmitted. However, by employing a mechanism to notify that its own system is operating among the cloud cooperation servers by heart beats or the like, the system return may be notified.

Therefore, because the empowerment response from the secondary cloud system 200 is not sent back, the release processing unit 116 in the cloud cooperation server 110 of the primary cloud system 100 waits for receiving the notification of the system return from the secondary cloud system 200 (step S121).

Then, when the secondary cloud system 200 returns, for example, the empowerment processing unit 213 in the cloud cooperation server 210 of the secondary cloud system 200 transmits the notification of the system return to the cloud cooperation server 110 of the primary cloud system 100, which is the empowerment source (step S123).

In response to this, the release processing unit 116 in the cloud cooperation server 110 of the primary cloud system 100 receives the notification of the system return from the cloud cooperation server 210 of the secondary cloud system 200 (step S125). Then, the release processing unit 116 identifies a system that has been returned from the notification of the system return (step S127). Here, it is identified that the system is the secondary cloud system 200. Here, a user may be identified who is influenced by the down of the system regardless of empowering the secondary cloud system 200, from data (e.g. FIG. 18) in the management information storage unit 111.

Then, the release processing unit 116 transmits a resource release request to release the resources that were secured for the primary cloud system 100 to the cloud cooperation server 210 of the secondary cloud system 200 (step S129). In response to this, the release processing unit 216 in the cloud cooperation server 210 of the secondary cloud system 200 receives the resource release request from the primary cloud system 100 (step S131).

Then, the release processing unit 216 performs a resource release processing (step S133). This resource release processing will be explained by using FIG. 21.

The release processing unit 216 identifies DC resources and NW resource that have been secured for the primary cloud system 100 of the requesting source of the resource release request from the data (e.g. FIG. 9) stored in the management information storage unit 211 (step S141).

Then, the release processing unit 216 transmits a release request of the DC resources, which includes data of the DC resources to be released to the storage management server 250, and transmits a release request of the NW resource, which includes data of the NW resource to be released to the network management server 260 (step S143).

When the release unit 253 of the storage management server 250 receives the release request of the DC resources from the cloud cooperation server 210 (step S145), and performs a resource release processing for the DC resources to be released (step S147). The specific contents of this processing are the same as those in the conventional art, and are not main portions of the embodiment. Therefore, further explanation is omitted. Then, the release unit 253 transmits a release response to the cloud cooperation server 210 (step S149).

Moreover, when the release unit 263 of the network management server 260 receives the release request of the NW resource from the cloud cooperation server 210 (step S151), the release unit 263 performs the resource release processing for the NW resource to be released (step S153). The specific contents of this processing are the same as those in the conventional art, and are not the main portions of this embodiment. Therefore, further explanation is omitted. Then, the release unit 263 transmits a release response to the cloud cooperation server 210 (step S155).

The release processing unit 216 of the cloud cooperation server 210 receives the release response from the network management server 260 and the storage management server 250 (step S157).

Thus, it is possible to early release the resources in the secondary cloud system 200, which are secured duplicately as a result, and utilize the resources effectively.

Figure 20:
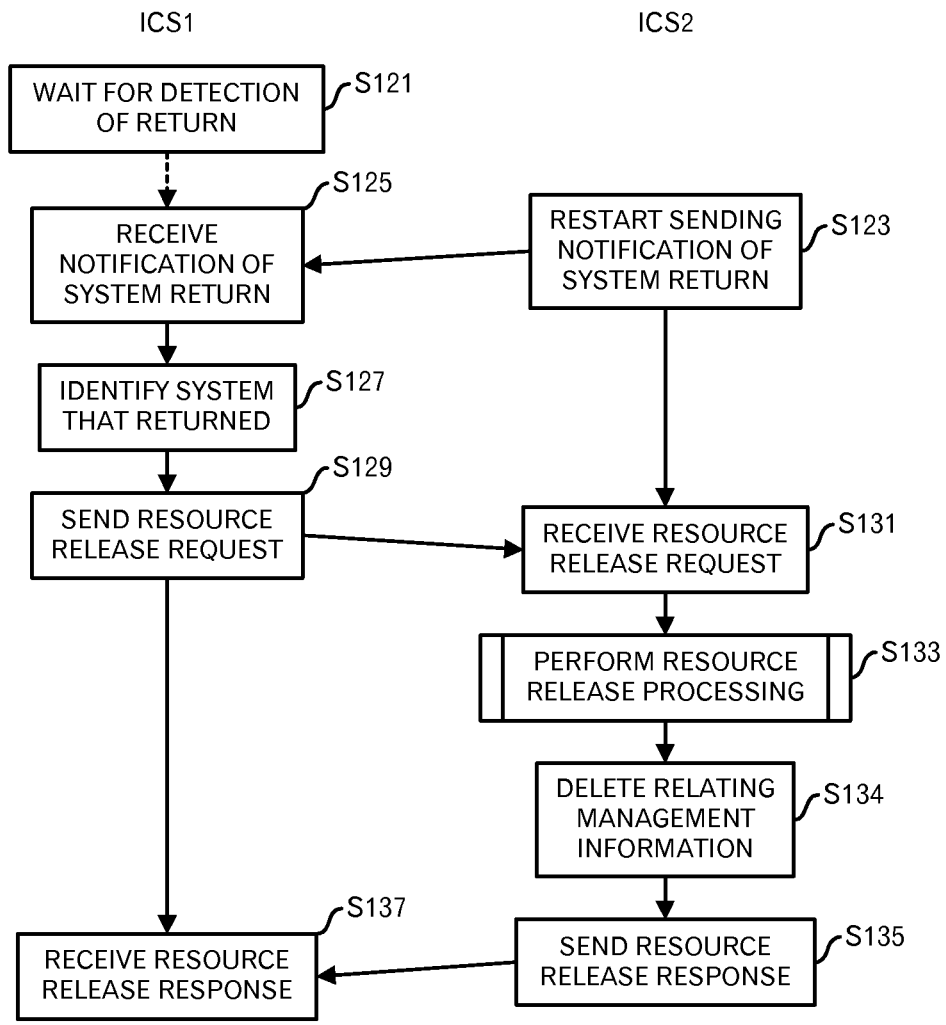
FIG. 20 is a diagram depicting a processing flow of a processing to cope with return.
Figure 21:
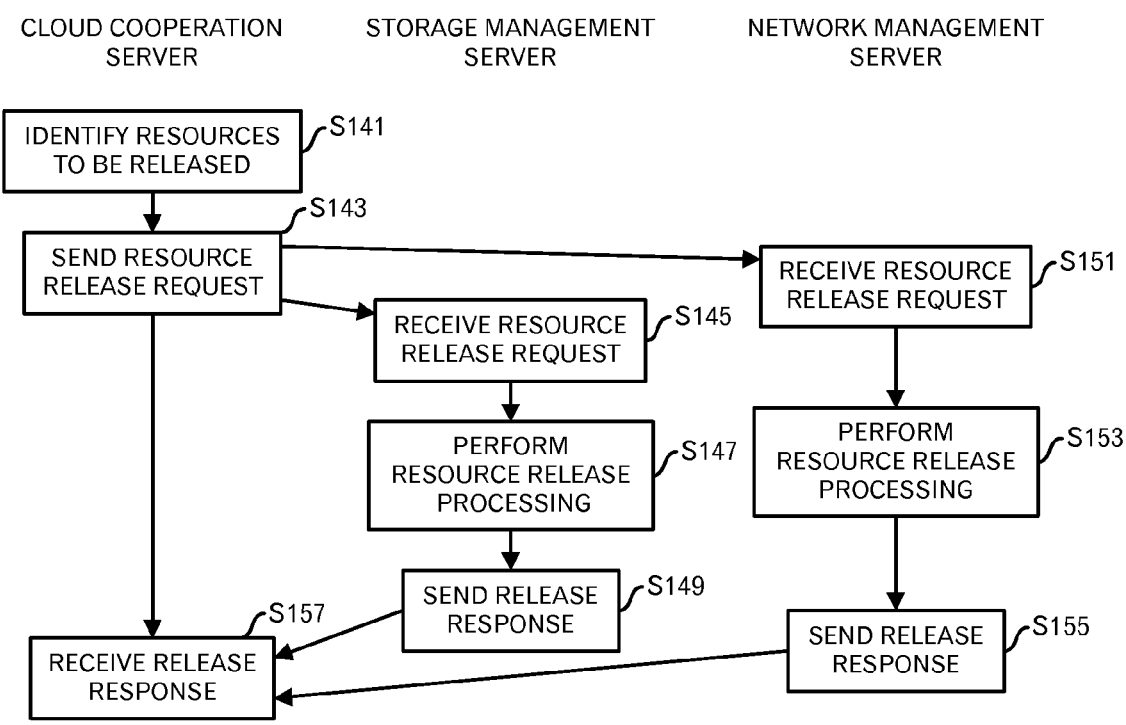
FIG. 21 is a diagram depicting a processing flow of a resource release processing.

Returning to the explanation of the processing in FIG. 20, the release processing unit 216 in the cloud cooperation server 210 of the secondary cloud system 200 deletes the management information included in the empowerment request from the primary cloud system 100, which relates to the released resources, from the management information storage unit 211 (step S134). When the management information is not deleted, the recovery processing may be executed in the secondary cloud system 200, because the empowerment request is not transmitted to the secondary cloud system 200. Therefore, by deleting the management information, it is possible to avoid such inconsistent operation.

Then, the release processing unit 216 transmits a resource release response to the cloud cooperation server 110 of the primary cloud system 100 (step S135).

The release processing unit 116 of the cloud cooperation server 110 in the primary cloud system 100 receives the resource release response from the cloud cooperation server 210 of the secondary cloud system 200 (step S137). In response to this resource release response, for example, in the management information storage unit 111, data of the system (here, the empowerment destination is the secondary cloud system 200), which relates to the released resources in the secondary cloud system 200 is deleted. For example, in the example of FIG. 18, a first record is deleted.

By performing the aforementioned processing, even though the secondary cloud system 200 that is an original empowerment destination returns, the resources that are secured in the secondary cloud system 200 are early released when there is another normal empowerment destination.

[Embodiment 2]

Figure 22:
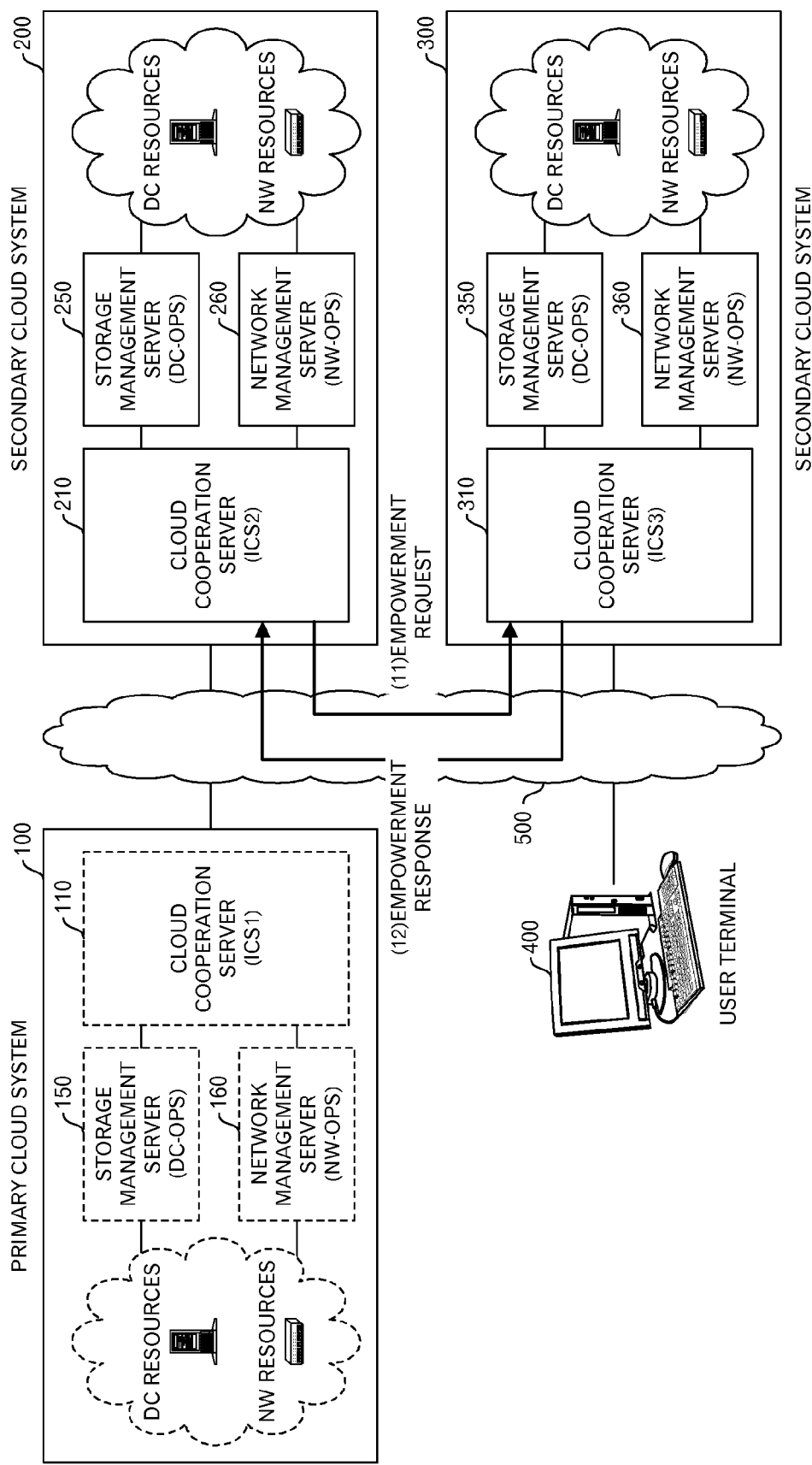
FIG. 22 is a diagram to explain an outline of a processing in a second embodiment.

The outline of the processing in this embodiment will be explained by using FIGS. 22 and 23. Firstly, as a presupposition, the primary cloud system 100 downs due to the failure or the like. Then, the recovery is performed in the secondary cloud system 200, and at least a portion of the system that is operating in the primary cloud system 100 is activated on the secondary cloud system 200.

Then, the cloud cooperation server 210 of the secondary cloud system 200 identifies a secondary cloud system having the next priority (here, the secondary cloud system 300) based on the data stored in the management information storage unit 211, and transmits an empowerment request to the cloud cooperation server 310 of the secondary cloud system 300 (step (11)).

Then, when the cloud cooperation server 310 of the secondary cloud system 300 is normally operating, the cloud cooperation server 310 receives the empowerment request and stores it in the management information storage unit 311, and transmits an empowerment response to the cloud cooperation server 210 of the secondary cloud system 200 (step (12)).

After this, a processing to back up data, which is held in the secondary cloud system 200, to the secondary cloud system 300 is performed.

Figure 23:
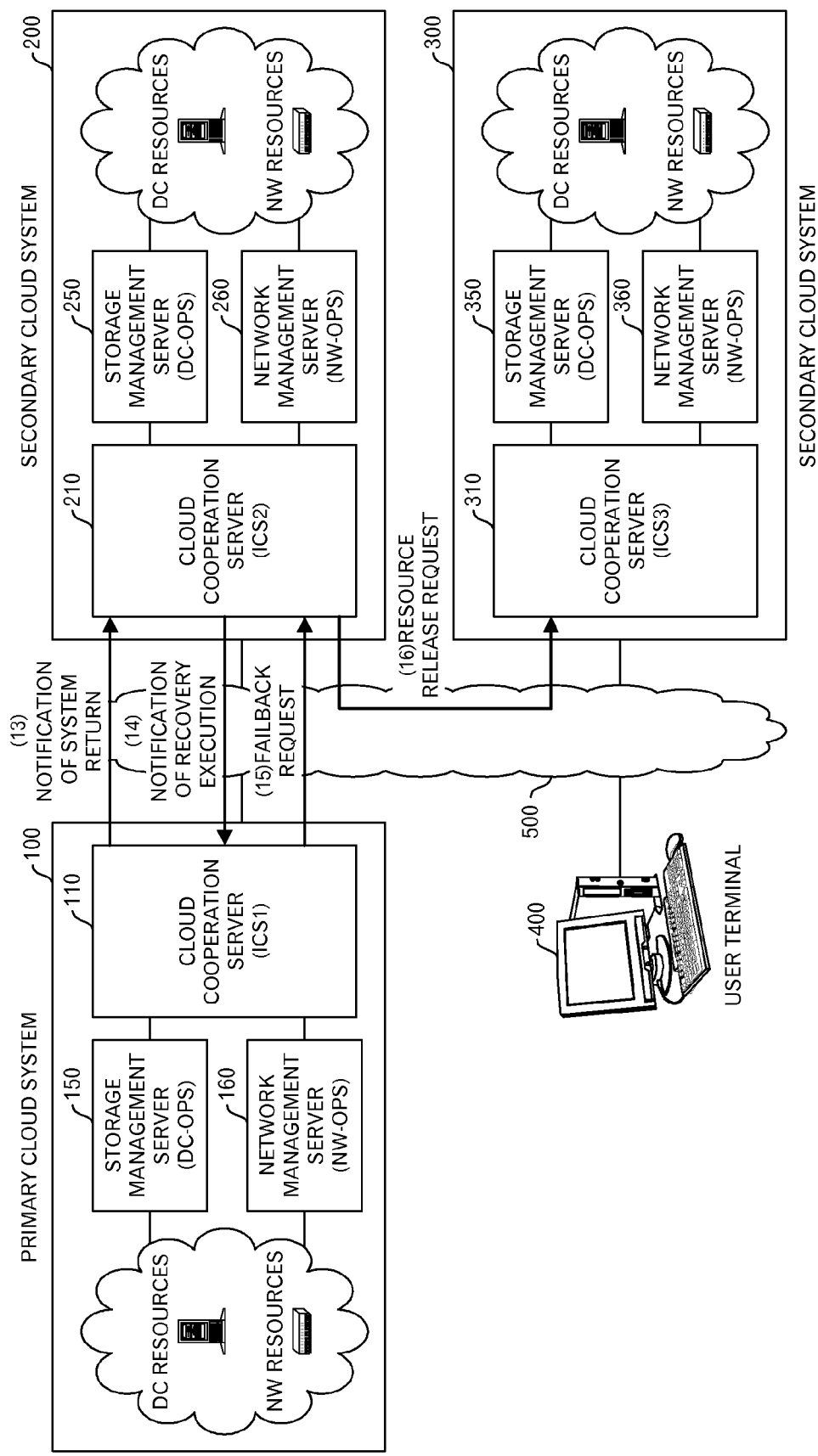
FIG. 23 is a diagram to explain the outline of the processing in the second embodiment.
Figure 24:
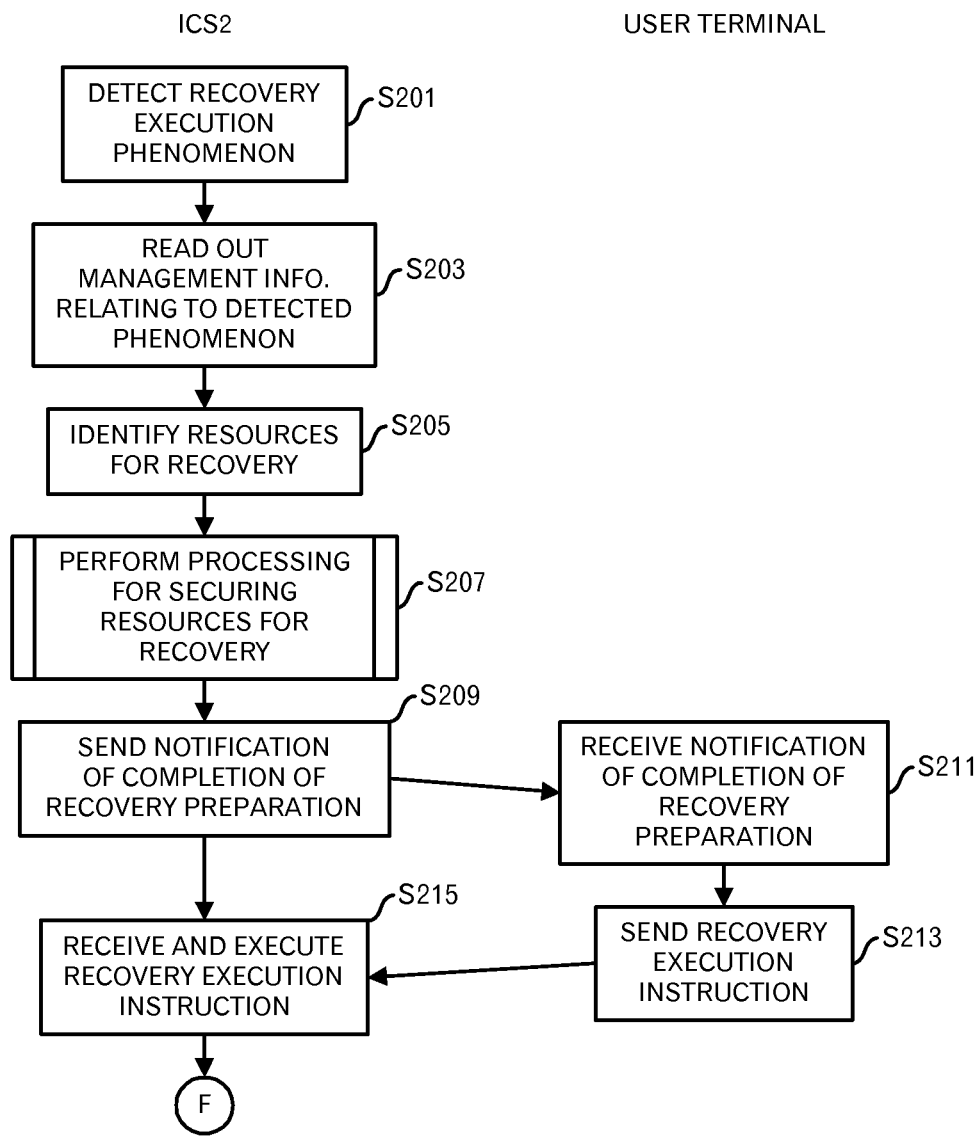
FIG. 24 is a diagram depicting a processing flow of a processing relating to the second embodiment.

After that, as illustrated in FIG. 23, when the primary cloud system 100 returns, the primary cloud system 100 transmits the notification of the system return to the cloud cooperation server 210 of the secondary cloud system 200, which is the empowerment destination for the recovery start (step (13)). In response to this, the cloud cooperation server 210 of the secondary cloud system 200 sends back notification of recovery execution to the cloud cooperation server 110 of the primary cloud system 100 (step (14)).

Then, the cloud cooperation server 110 of the primary cloud system 100 transmits a failback request to the cloud cooperation server 210 of the secondary cloud system 200 in order to operate the system in the primary cloud system 100 again (step (15)).

When the system is activated again in the primary cloud system 100, the resources that have been secured in the secondary cloud system 300 is not used. Then, the cloud cooperation server 210 of the secondary cloud system 200 transmits a resource release request to the cloud cooperation server 310 of the secondary cloud system 300 (step (16)). Thus, the resources that are duplicately secured are released in the secondary cloud system 300, and furthermore, the associated management information is deleted from the management information storage unit 311.

With this configuration, even when the failback is performed in the primary cloud system 100, the duplicate resources are early released, and the resource is effectively utilized.

This processing will be explained by using FIGS. 24 to 30 more specifically.

Firstly, a processing after the timing when a failure or the like occurs in the primary cloud system 100, and the empowerment request is not transmitted to the cloud cooperation server 210 of the secondary cloud system 200 from the cloud cooperation server 110 will be explained.

When the empowerment request from the primary cloud system 100 has not been received for a predetermined time period or more, the empowerment processing unit 213 in the cloud cooperation server 210 of the secondary cloud system 200 detects a recovery execution phenomenon (FIG. 24: step S201), and stores "NG" for data concerning that the empowerment source is the primary cloud system 100 in the management information storage unit 211, as the periodical result, for example.

Then, the recovery processing unit 215 in the cloud cooperation server 210 reads out the management information relating to the primary cloud system 100 that does not transmit the empowerment request from the management information storage unit 211 (step S203), and identifies resources for the recovery (step S205). For example, the resource data in the data (FIG. 4) stored in the management information storage unit 211 is employed as it is.

Then, the recovery processing unit 215 performs a processing for securing resources for the recovery (step S207). The processing contents are the same as those in the processing for securing resources in FIG. 16, however, the execution entity in the cloud cooperation server 210 becomes the recovery processing unit 215, and the resources to be secured are different.

Then, the recovery processing unit 215 of the cloud cooperation server 210 transmits notification of recovery preparation completion to the user terminal 400 (step S209). When the user terminal 400 receives the notification of the recovery preparation completion from the cloud cooperation server 210 of the secondary cloud system 200 (step S211), the user terminal 400 displays the notification on the display device, for example, to cause the user to check the notification. The user checks the notification, and then operates the user terminal 400 to input a recovery execution instruction. Then, the user terminal 400 accepts the recovery execution instruction, and transmits a recovery execution instruction to the cloud cooperation server 210 of the secondary cloud system 200 (step S213).

Then, the recovery processing unit 215 in the cloud cooperation server 210 of the secondary cloud system 200 receives the recovery execution instruction, and performs the recovery processing (step S215). The recovery processing itself is the same as that in the conventional art, and is not the main portion in this embodiment. Therefore, further explanation is omitted. Thus, the system is activated in the secondary cloud system 200. At this time, the recovery execution time is stored in the management information storage unit 211. The processing shifts to a processing in FIG. 25 through terminal F.

Figure 25:
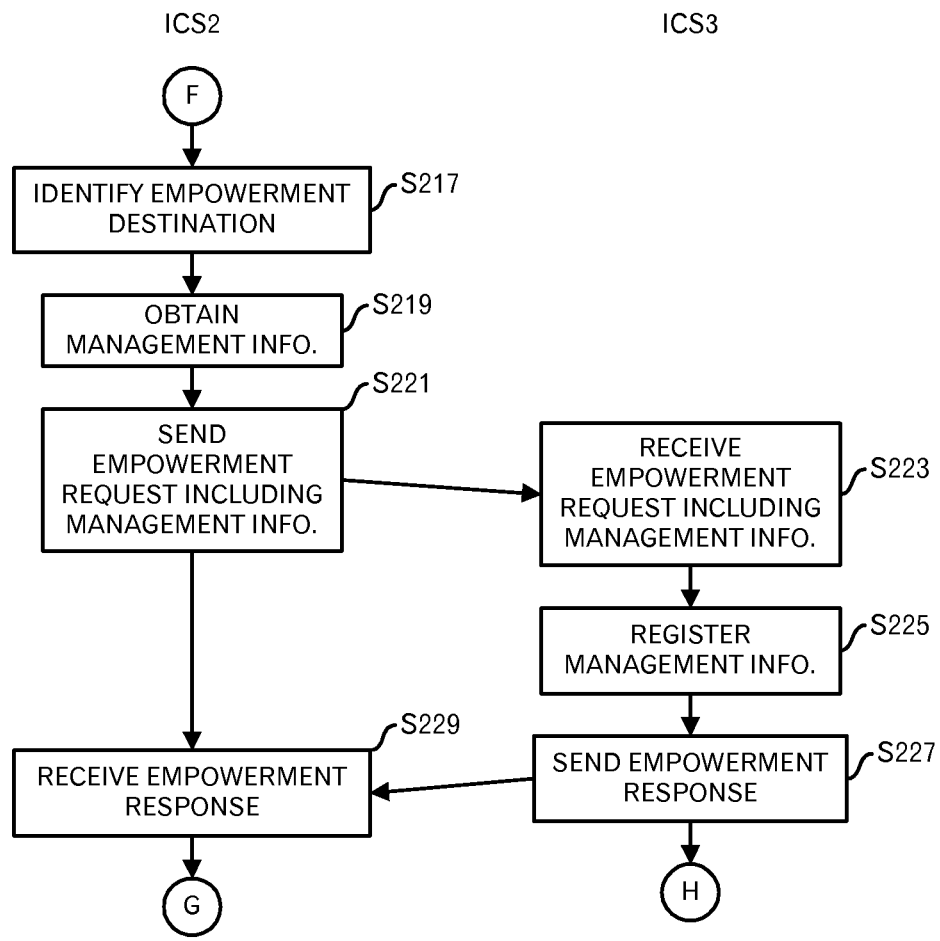
FIG. 25 is a diagram depicting a processing flow of the processing relating to the second embodiment.

Shifting to the explanation of the processing in FIG. 25, the empowerment processing unit 213 in the cloud cooperation server 210 (i.e. ICS2) of the secondary cloud system 200 identifies, based on the data stored in the management information storage unit 211, the empowerment destination by selecting a cloud system having the next priority to its own cloud system from the list of candidates of the empowerment destination (step S217). In the example of FIG. 3, the secondary cloud system 300 is identified.

Moreover, the empowerment processing unit 213 reads out the management information to be attached to the empowerment request from the management information storage unit 211 (step S219). As described above, the management information includes an ID (identifier) of an ICS that is the empowerment source, a user ID of the empowerment source, data of resources to be secured and a list of candidates of the empowerment destination.

Then, the empowerment processing unit 213 transmits the empowerment request including the management information to the cloud cooperation server 310 (i.e. ICS3) of the secondary cloud system 300 (step S221). In response to this, the empowerment processing unit 313 of the cloud cooperation server 310 (i.e. ICS3) receives the empowerment request including the management information from the secondary cloud system 200 (step S223), and registers the received management information in the management information storage unit 311 (step S225). Almost the same data as illustrated in FIG. 4 is stored. However, as for the ICS of the empowerment source and the address of the empowerment source, data of the secondary cloud system 200 is additionally held. The periodical result becomes "OK" at this state.

Then, the empowerment processing unit 313 of the cloud cooperation server 310 (i.e. ICS3) transmits an empowerment response to the cloud cooperation server 210 of the secondary cloud system 200 (step S227).

In response to this, the empowerment processing unit 213 of the cloud cooperation server 210 receives the empowerment response from the cloud cooperation server 310 of the secondary cloud system 300 (step S229). Then, as illustrated in FIG. 26, in the management information storage unit 211, as the ID of the ICS that is the empowerment destination and the address of the empowerment destination, data of the secondary cloud system 300 is set, "OK" and the response receipt time of the empowerment are set as the update result of the management information, and "waiting" is set as the service providing state. Then, the processing shifts to a processing in FIG. 27 through terminals G and H.

The steps S221 to S229 are performed, for example, periodically, however, when the management information is updated in the cloud cooperation server 310, the data stored in the management information storage unit 311 is updated.

Figure 27:
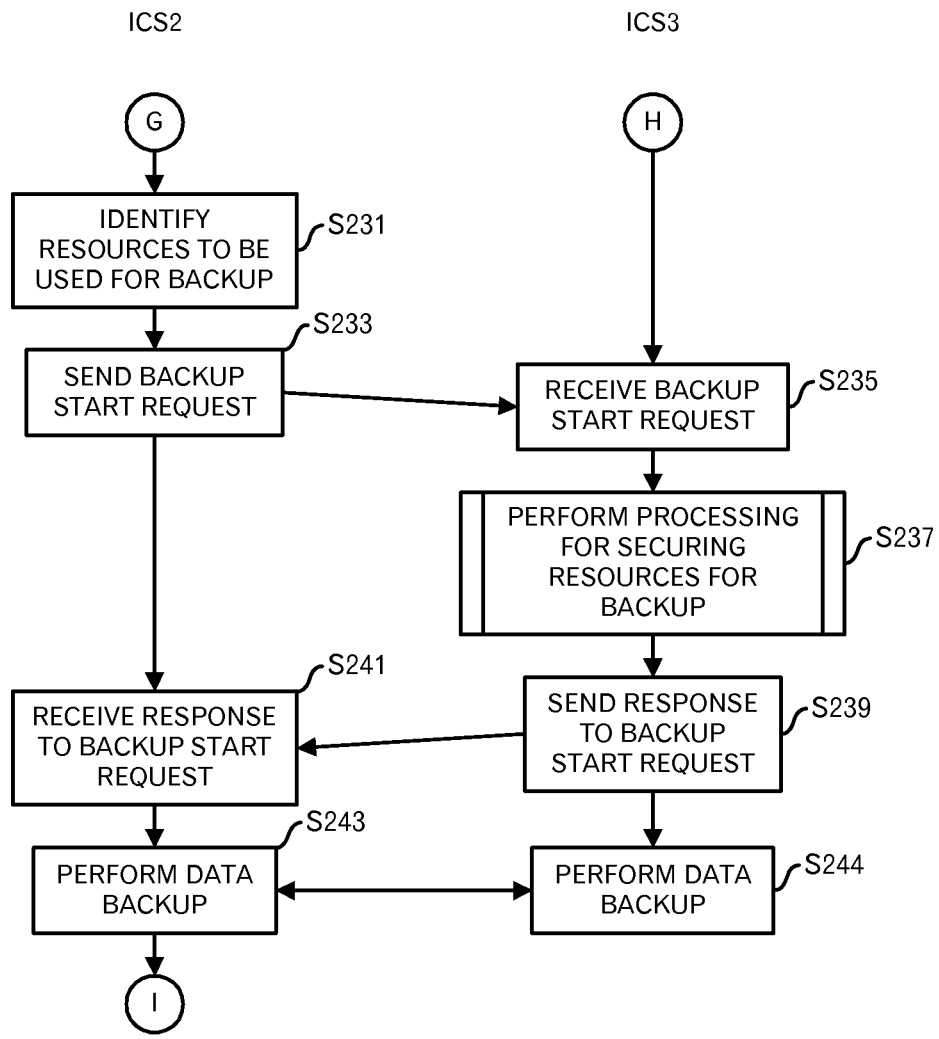
FIG. 27 is a diagram depicting a processing flow of the processing relating to the second embodiment.

Shifting to the explanation of the processing in FIG. 27, next the backup processing unit 214 of the cloud cooperation server 210 identifies resources to be used for the backup from the resource data (FIG. 9) stored in the management information storage unit 211 (step S231). For example, a storage amount to be secured for the backup is identified based on a storage amount being used currently. Furthermore, the CPU amount and network resources that are typically used when the backup is performed are identified, for example.

Then, the backup processing unit 214 transmits a backup start request including data of the resources to be secured for the backup to the cloud cooperation server 310 of the secondary cloud system 300 (step S233).

In response to this, the backup processing unit 314 in the cloud cooperation server 310 of the secondary cloud system 300 receives the backup start request including the data of the resources to be secured from the cloud cooperation server 210 of the secondary cloud system 200 (step S235).

Then, the secondary cloud system 300 performs the processing for securing resources for the backup (step S237). This processing for securing resources is the similar to the processing in FIG. 16. The execution entity is the secondary cloud system 300 instead of the secondary cloud system 200.

After that, the backup processing unit 314 of the cloud cooperation server 310 transmits a response to the backup start request to the backup processing unit 214 of the cloud cooperation server 210 (step S239). The backup processing unit 214 of the cloud cooperation server 210 receives the response to the backup start request from the cloud cooperation server 310 of the secondary cloud system 300 (step S241). Then, the backup processing unit 214 instructs the storage management server 250 to start the backup, and the storage management server 250 performs the backup processing with the storage management server 350 in the secondary cloud system 300 (steps S243 and S244). The specific contents of the backup processing are the same as that in the conventional art, and are not the main portions of the embodiment. Therefore, further explanation is omitted. After that, the processing shifts to a processing in FIG. 28 through terminal I. As described above, for example, periodically, the empowerment request is transmitted from the secondary cloud system 200 to the secondary cloud system 300.

Figure 28:
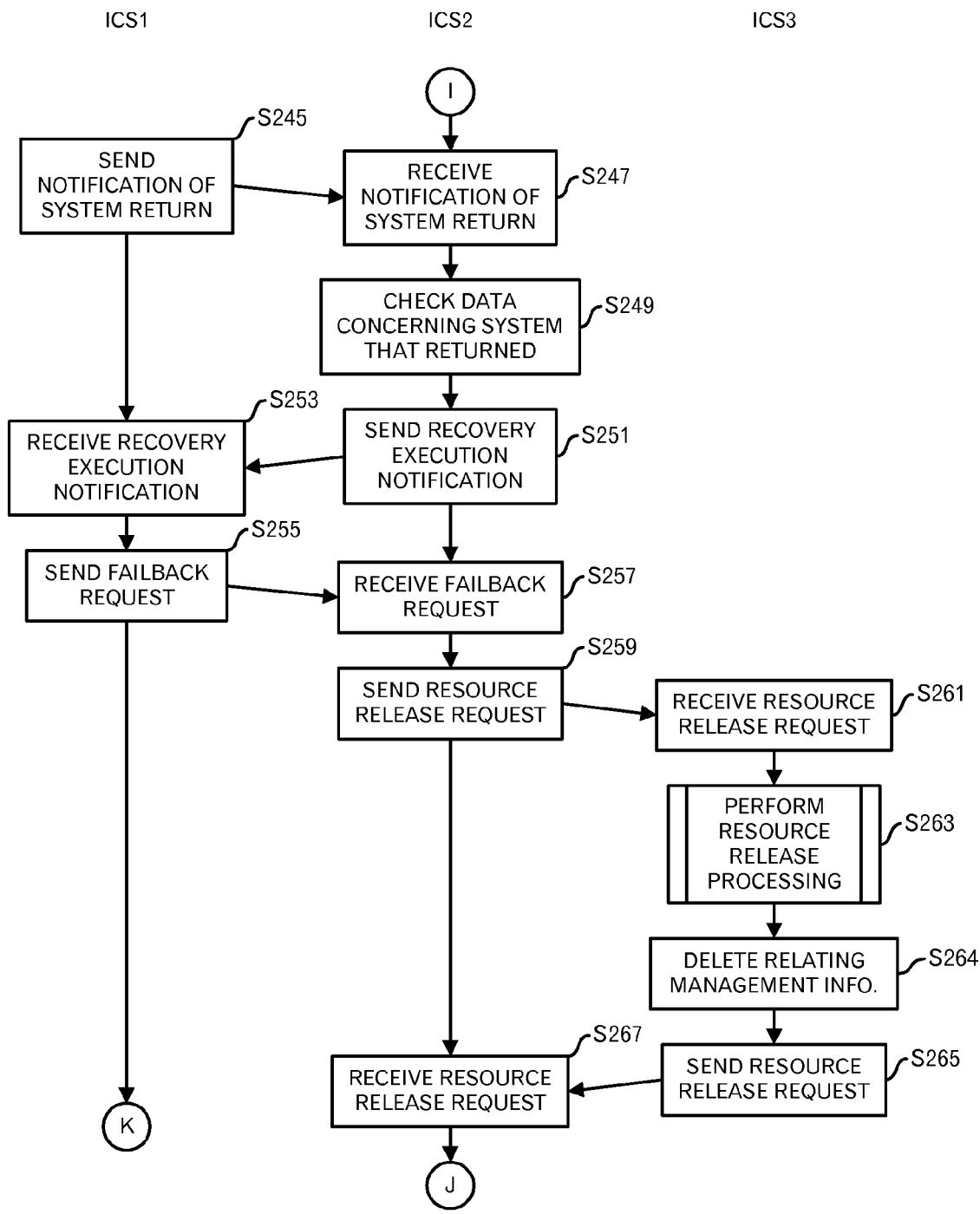
FIG. 28 is a diagram depicting a processing flow of the processing relating to the second embodiment.

Shifting to the explanation of a processing in FIG. 28, it is assumed that the primary cloud system 100 operates properly at this stage.

In this embodiment, when the system returns from the failure, data concerning the empowerment destination is extracted from data stored, for example, in the management information storage unit to transmit the notification of the system return. However, the system return may be notified by employing a mechanism to notify that its own system is operating, among the cloud cooperation servers, by the heart beats, for example.

Here, the return processing unit 117 in the cloud cooperation server 110 of the primary cloud system 100 transmits the notification of the system return to the cloud cooperation server 210 of the secondary cloud system 200 (step S245).

In response to this, the return processing unit 217 in the cloud cooperation server 210 of the secondary cloud system 200 receives the notification of the system return from the cloud cooperation server 110 of the primary cloud system 100 (step S247). Then, the return processing unit 217 checks data concerning the cloud system that has returned, in the management information storage unit 211 (step S249). Here, the management information whose empowerment source is the primary cloud system 100 and data of the recovery execution time are read out. Because the recovery has been executed here, the recovery execution time is read out, however, when the recovery is not performed, the recovery execution time is not read out.

Then, the return processing unit 217 of the cloud cooperation server 210 transmits notification of recovery execution, which includes the recovery execution time to the cloud cooperation server 110 of the primary cloud system 100 (step S251). In response to this, the return processing unit 117 of the cloud cooperation server 110 receives the notification of the recovery execution, which includes the recovery execution time, from the return processing unit 217 of the cloud cooperation server 210 (step S253), and stores the recovery execution time in the management information storage unit 111.

Furthermore, because the return processing unit 117 of the cloud cooperation server 110 reactivates the system in the primary cloud system 100, the return processing unit 117 transmits a failback request to the cloud cooperation server 210 of the secondary cloud system 200 (step S255). The return processing unit 217 of the cloud cooperation server 210 in the secondary cloud system 200 receives the failback request from the cloud cooperation server 110 of the primary cloud system 100 (step S257). Then, in order to release the resources that are separately secured in the transmission destination of the empowerment request in association with the down of the primary cloud system 100, the return processing unit 217 transmits a resource release request to release the resources relating to the empowerment request to the cloud cooperation server 310 of the secondary cloud system 300 (step S259).

The release processing unit 316 in the cloud cooperation server 310 of the secondary cloud system 300 receives the resource release request to release the resources relating to the aforementioned empowerment request from the cloud cooperation server 210 of the secondary cloud system 200 (step S261). Then, the secondary cloud system 300 performs the resource release processing (step S263). The explanation of the resource release processing is omitted, because it is the same as that in FIG. 21. However, the execution entity is different.

When the resource release processing is completed, the release processing unit 316 of the cloud cooperation server 310 deletes management information that is included in the aforementioned empowerment request and stored in the management information storage unit 311 from the management information storage unit 311 (step S264). Thus, when the empowerment request is not transmitted from the secondary cloud system 200 to the secondary cloud system 300, the situation that the recovery processing is performed is avoided.

Furthermore, the release processing unit 316 transmits a resource release response to the cloud cooperation server 210 of the secondary cloud system 200 (step S265). The return processing unit 217 in the cloud cooperation server 210 of the secondary cloud system 200 receives the resource release response from the cloud cooperation server 310 of the secondary cloud system 300 (step S267). In response to this resource release response, data of the system relating to the resources released in the secondary cloud system 300 is deleted, for example, in the management information storage unit 211. For example, a first record is deleted in the example of FIG. 26. The processing shifts to a processing in FIG. 29 through terminals J and K.

By performing the aforementioned processing, the resources of the secondary cloud system 300, which are duplicately secured when the primary cloud system 100 returns and performs the failback, are early released.

Figure 29:
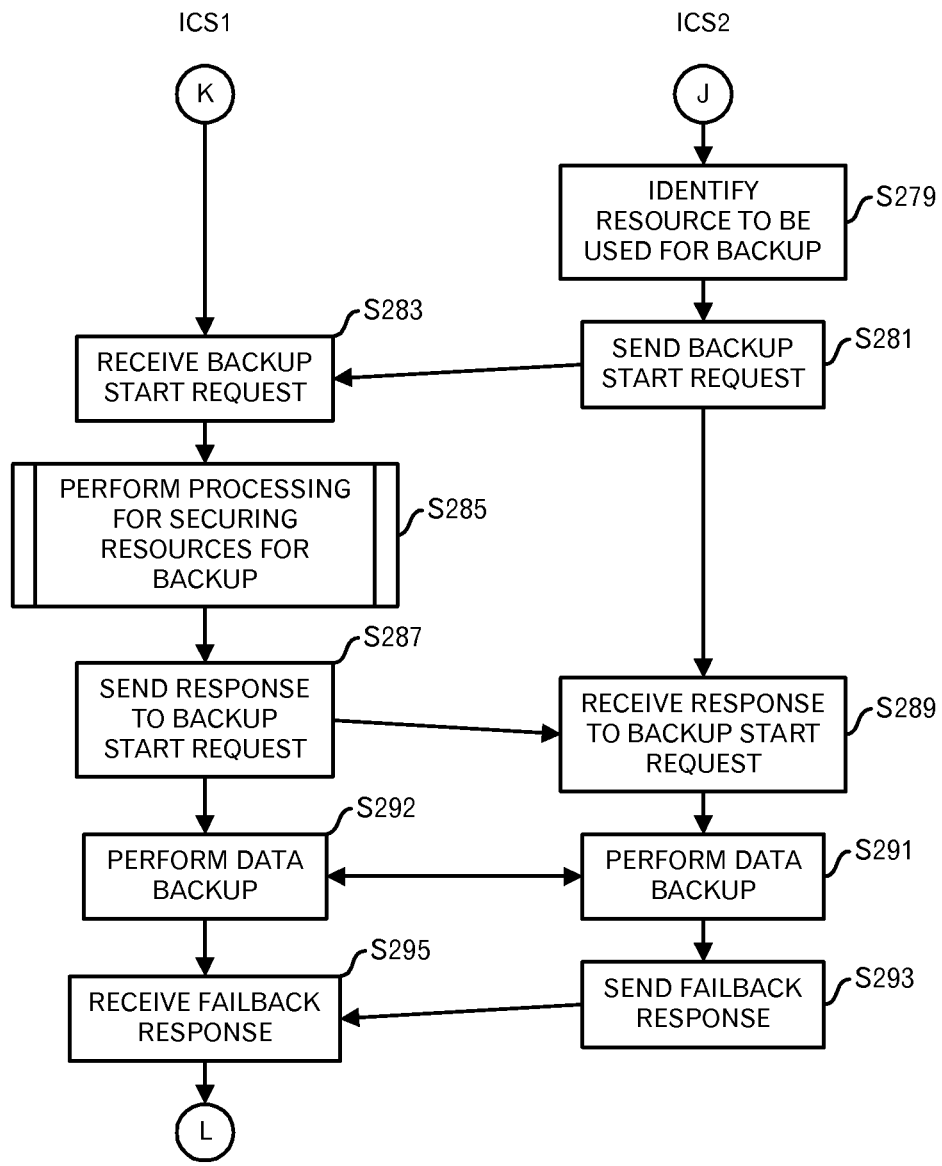
FIG. 29 is a diagram depicting a processing flow of the processing relating to the second embodiment.

Shifting to the explanation of the processing in FIG. 29, after the step S267 or in parallel with the steps S259 to S267, the backup processing unit 214 in the cloud cooperation server 210 of the secondary cloud system 200 identifies resources used in the backup from the resource data (FIG. 9) stored in the management information storage unit 211 (step S279). For example, a storage amount to be secured in the backup is identified from the storage amount being used presently. Furthermore, the CPU amount and network resource, which are used typically when the backup is performed, are identified.

Then, the backup processing unit 214 transmits a backup start request including the data of the resources to be secured for the backup to the cloud cooperation server 110 of the primary cloud system 100 (step S281).

In response to this, the backup processing unit 114 in the cloud cooperation server 110 of the primary cloud system 100 receives the backup start request including the data of the resources to be secured from the cloud cooperation server 210 of the secondary cloud system 200 (step S283).

Then, the primary cloud system 100 performs a processing for securing resources for the backup (step S285). The processing for securing resources is the same as that in FIG. 16. However, the execution entity is the primary cloud system 100, instead of the secondary cloud system 200.

After that, the backup processing unit 114 of the cloud cooperation server 110 transmits a response to the backup start request to the backup processing unit 214 of the cloud cooperation server 210 (step S287). The backup processing unit 214 of the cloud cooperation server 210 receives the response to the backup start request from the cloud cooperation server 110 of the primary cloud system 100 (step S289). Then, the backup processing unit 214 instructs the storage management server 250 to start the backup, and the storage management server 250 performs the backup processing with the storage management server 150 in the primary cloud system 100 (steps S291 and S292). The specific contents of the backup processing are the same as those in the conventional art, and are not main portions of this embodiment. Therefore, further explanation is omitted.

When the backup processing has been completed, the return processing unit 217 in the cloud cooperation server 210 of the secondary cloud system 200 transmits a failback response to the cloud cooperation server 110 of the primary cloud system 100 (step S293). Then, the return processing unit 117 in the cloud cooperation server 110 of the primary cloud system 100 receives the failback response from the cloud cooperation server 210 of the secondary cloud system 200 (step S295). The processing shifts to a processing in FIG. 30 through terminal L.

Figure 30:
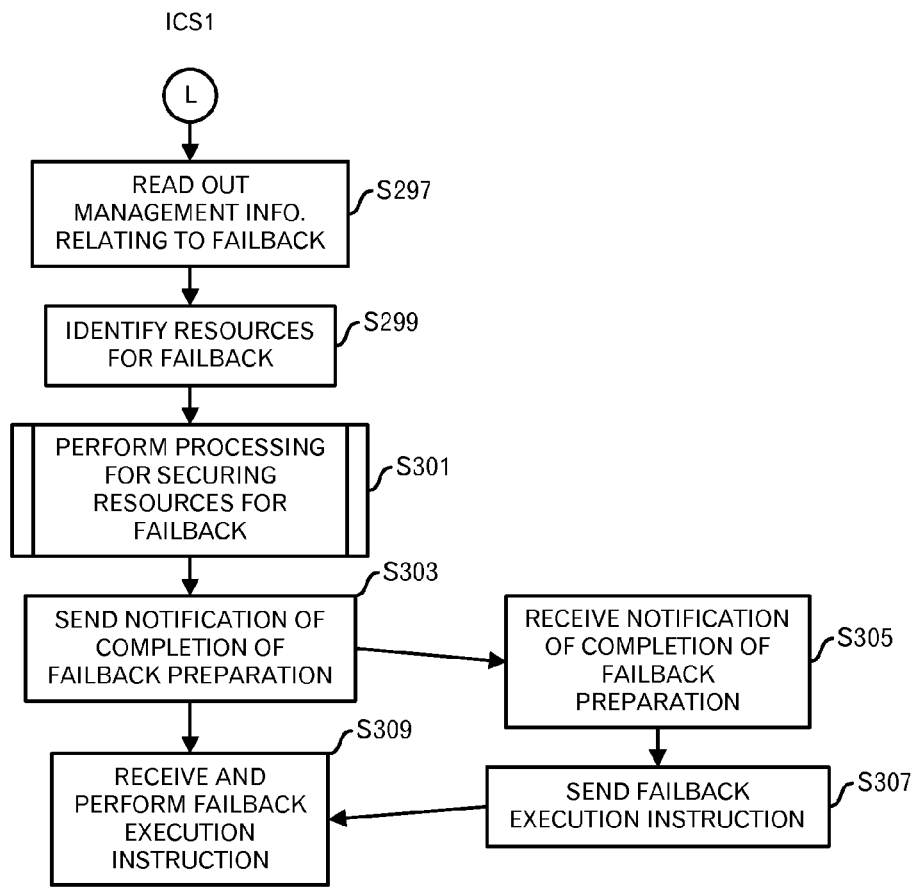
FIG. 30 is a diagram depicting a processing flow of the processing relating to the second embodiment.

Shifting to the explanation of the processing in FIG. 30, the return processing unit 117 reads out the management information relating to this failback from the management information storage unit 111 (step S297), and identifies resources for the failback (step S299). For example, data of the resources included in the management information may be employed as they are. Then, the primary cloud system 100 performs the processing for securing resources to secure the resources for the failback (step S301). This processing for securing resources is the same as that in FIG. 16. However, points are different that the execution entity is the primary cloud system 100, and the resources for the failback are secured.

When the processing for securing resources is completed, the return processing unit 117 transmits notification of completion of failback preparation to the user terminal 400 (step S303). The user terminal 400 receives the notification of the completion of the failback preparation from the cloud cooperation server 110 of the primary cloud system 100 (step S305), and displays the notification, for example, on the display device to cause the user to confirm the notification. After the confirmation, the user operates the user terminal 400 to input a failback execution instruction. Then, the user terminal 400 accepts the failback execution instruction, and transmits the failback execution instruction to the cloud cooperation server 110 of the primary cloud system 100 (step S307).

Then, the return processing unit 117 in the cloud cooperation server 110 of the primary cloud system 100 receives the failback execution instruction, and performs a failback processing (step S309). The failback processing itself is the same as that in the conventional art, and is not the main portion of this embodiment. Therefore, further explanation is omitted. By this processing, the system is reactivated in the primary cloud system 100.

By performing the aforementioned processing, the resources that are secured in the secondary cloud system 300, however, are not used when the primary cloud system 100 returns, can be early released.

Although the embodiments of this invention were explained above, this invention is not limited to those embodiments. For example, the functional block configurations of the cloud cooperation servers, storage management servers and network management servers may not correspond to program module configurations.

Moreover, as for the processing flows, as long as the processing results do not change, the turns of the steps may be exchanged or plural steps may be executed in parallel.

Figure 31:
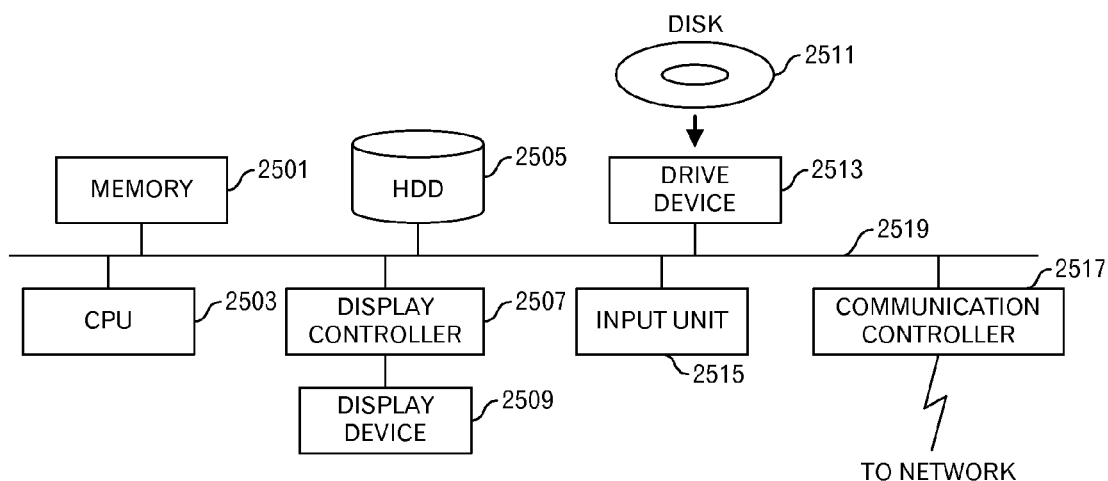
FIG. 31 is a functional block diagram of a computer.

In addition, the cloud cooperation server, storage management server, network management server and physical machines included in the cloud system are computer devices as illustrated in FIG. 31. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 31. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

A redundancy processing method relating to a first aspect of the embodiments includes: (A) identifying, by using a first information processing apparatus in a first system, a second system that performs a first processing on behalf of the first system when an abnormality occurs in the first system; (B) transmitting, by using the first information processing apparatus, a first request that includes data concerning resources used to perform the first processing to a second information processing apparatus in the second system; (C) upon detecting an abnormality in the second system, identifying, by using the first information processing apparatus, a third system other than the second system; (D) transmitting, by using the first information processing apparatus, a second request that includes data concerning resources used to perform the first processing to a third information processing apparatus in the third system; and (E) upon detecting return of the second system, transmitting, by using the first information processing apparatus, a third request to release resources secured for the first system to the second information processing apparatus in the second system.

Even when the second system that is a secondary system returns after the second system becomes down, it becomes possible to early release resources that were secured duplicately in the second system.

Moreover, the aforementioned abnormality of the second system may be detected by not receiving a response to the first request that is repeatedly transmitted, from the second information processing apparatus within a predetermined time period. In addition, existing methods such as heart beat may be employed.

Furthermore, the redundancy processing method relating to the first aspect of the embodiment may further include, after receiving a response to the first request from the second information processing apparatus, transmitting a fourth request to request backup of data used in the first processing. Thus, the recovery processing can be performed in a short time period.

Furthermore, the aforementioned third request may include a request to delete the data included in the first request. Thus, the second information processing apparatus in the second system does not perform a processing using the data included in the first request, and inconsistency of the processing can be avoided.

A redundancy processing method relating to a second aspect of the embodiments includes: (A) identifying, by using a first information processing apparatus in a first system, a second system that performs a first processing on behalf of the first system when an abnormality occurs in the first system; (B) transmitting, by using the first information processing apparatus, a first request that includes data concerning resources used to perform the first processing to a second information processing apparatus in the second system; (C) after the abnormality in the first system is detected, identifying, by using the second information processing apparatus, a third system that performs the first processing on behalf of the first and second systems when an abnormality occurs in the second system; (D) transmitting, by using the second information processing apparatus, a second request that includes data concerning resources used to perform the first processing to a third information processing apparatus in the third system; and (E) upon detecting that the first system returns and the first processing is returned to the first system, transmitting, by using the second information processing apparatus, a third request to release resources that were secured for the first system to the third information processing apparatus in the third system.

When the first system returns and the failback is performed, the resources in the third system, which were secured by the down of the first system that is a primary system, can be early released.

This redundancy processing method relating to the second aspect of the embodiment may further include: (F) transmitting, by using the second information processing apparatus, a fourth request to request backup of data used in the first processing to the third information processing apparatus. Thus, the recovery processing in the third system is performed early.

Furthermore, the third request may include a request to delete the data included in the second request. Thus, the third information processing apparatus in the third system does not perform a wasteful processing based on the data included in the second request, and inconsistency of the processing can be avoided.

A redundancy processing system relating to a third aspect of the embodiments includes: a first system that includes a first information processing apparatus; a second system that includes a second information processing apparatus; and a third system that includes a third information processing apparatus. In such a case, the first information processing apparatus includes circuitry or a processor programmed to identify the second system that performs a first processing on behalf of the first system when an abnormality occurs in the first system, and to transmit a first request that includes data concerning resources used to perform the first processing to the second information processing apparatus in the second system. Furthermore, the second information processing apparatus includes circuitry or a processor programmed to store the data included in the first request in response to receipt of the first request. In addition, the first information processing apparatus further includes circuitry or a processor to identify the third system upon detecting an abnormality in the second system, and to transmit a second request that includes data concerning resources used to perform the first processing to the third information processing apparatus in the third system, and to transmit a third request to release resources that were secured for the first system to the second information processing apparatus in the second system upon detecting return of the second system.

A redundancy processing system relating to a fourth aspect of the embodiments includes a first system that includes a first information processing apparatus; and a second system that includes a second information processing apparatus. In such a case, the first information processing apparatus includes circuitry or a processor programmed to identify the second system that performs a first processing on behalf of the first system when an abnormality occurs in the first system, to transmit a first request that includes data concerning resources used to perform the first processing to the second information processing apparatus in the second system. The second information processing apparatus includes circuitry or a processor programmed to identify a third system that performs the first processing on behalf of the first and second systems when an abnormality occurs in the second information processing apparatus, after the abnormality in the first system is detected, to transmit a second request that includes data concerning resources used to perform the first processing to a third information processing apparatus in the third system, and to transmit a third request to release resources that were secured for the first system to the third information processing apparatus in the third system, upon detecting that the first system returns and the first processing is returned to the first system. Incidentally, it is possible to create a program causing a computer or a processor to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A redundancy processing method, comprising:
   identifying, by using a first information processing apparatus in a first system, a second system that performs a first processing on behalf of the first system when an abnormality occurs in the first system;
   transmitting, by using the first information processing apparatus, a first request that includes data concerning securing resources used to perform the first processing to a second information processing apparatus in the second system;
   upon detecting an abnormality in the second system, identifying, by using the first information processing apparatus, a third system other than the second system;
   transmitting, by using the first information processing apparatus, a second request that includes the data concerning securing the resources used to perform the first processing to a third information processing apparatus in the third system;
   receiving, by using the first information processing apparatus and from the second information processing apparatus, a notification representing that the second system has recovered; and
   upon receiving the notification, transmitting, by using the first information processing apparatus, a third request to release the resources secured for the first system to the second information processing apparatus.

2. The redundancy processing method as set forth in claim 1, wherein the abnormality of the second system is detected by not receiving a response to the first request that is repeatedly transmitted, from the second information processing apparatus within a predetermined time period.

3. The redundancy processing method as set forth in claim 1, further comprising after receiving a response to the first request from the second information processing apparatus, transmitting, by using the first information processing apparatus, a fourth request to request backup of data used in the first processing to the second information processing apparatus.

4. The redundancy processing method as set forth in claim 1, wherein the third request includes a request to delete the data included in the first request.

5. A redundancy processing method, comprising:
identifying, by using a first information processing apparatus in a first system, a second system that performs a first processing on behalf of the first system when an abnormality occurs in the first system;
transmitting, by using the first information processing apparatus, a first request that includes data concerning securing resources used to perform the first processing to a second information processing apparatus in the second system;
after the abnormality in the first system is detected, identifying, by using the second information processing apparatus, a third system that performs the first processing on behalf of the first and second systems when an abnormality occurs in the second system;
transmitting, by using the second information processing apparatus, a second request that includes the data concerning securing the resources used to perform the first processing to a third information processing apparatus in the third system;
receiving, by using the second information processing apparatus and from the first information processing apparatus, a notification representing that the first system has recovered and the first system performs the first processing; and
upon receiving the notification, transmitting, by using the second information processing apparatus, a third request to release the resources secured for the first system to the third information processing apparatus.

6. The redundancy processing method as set forth in claim 5, further comprising transmitting, by using the second information processing apparatus, a fourth request to request backup of data used in the first processing to the third information processing apparatus.

7. The redundancy processing method as set forth in claim 5, wherein the third request includes a request to delete the data included in the second request.

8. A redundancy processing system, comprising:
a first system that includes a first information processing apparatus;
a second system that includes a second information processing apparatus; and
a third system that includes a third information processing apparatus, and
wherein
the first information processing apparatus comprises:
a first memory; and
a first processor coupled to the first memory and configured to:
identify the second system that performs a first processing on behalf of the first system when an abnormality occurs in the first system; and
transmit a first request that includes data concerning securing resources used to perform the first processing to the second information processing apparatus,
the second information processing apparatus comprises:
a second memory; and
a second processor coupled to the second memory and configured to store the data included in the first request in response to receipt of the first request, and
the first processor is further configured to:
identify the third system upon detecting an abnormality in the second system;
transmit a second request that includes the data concerning securing the resources used to perform the first processing to the third information processing apparatus;
receive, from the second information processing apparatus, a notification representing that the second system has recovered; and
transmit a third request to release the resources secured for the first system to the second information processing apparatus upon receiving the notification.

9. An information processing apparatus for a first system, comprising:
a memory; and
a processor coupled to the memory and configured to:
identify a second system that performs a first processing on behalf of the first system when an abnormality occurs in the first system;
transmit a first request that includes data concerning securing resources used to perform the first processing to a second information processing apparatus in the second system;
upon detecting an abnormality in the second system, identify a third system other than the second system;
transmit a second request that includes the data concerning securing the resources used to perform the first processing to a third information processing apparatus in the third system;
receive, from the second information processing apparatus, a notification representing that the second system has recovered; and
upon receiving the notification, transmit a third request to release the resources secured for the first system to the second information processing apparatus.

10. A redundancy processing system, comprising:
a first system that includes a first information processing apparatus; and
a second system that includes a second information processing apparatus, and
wherein
the first information processing apparatus comprises:
a first memory; and
a first processor coupled to the first memory and configured to:
identify the second system that performs a first processing on behalf of the first system when an abnormality occurs in the first system; and
transmit a first request that includes data concerning securing resources used to perform the first processing to the second information processing apparatus, and
the second information processing apparatus comprises:
a second memory; and
a second processor coupled to the second memory and configured to:
identify a third system that performs the first processing on behalf of the first and second systems when an abnormality occurs in the second system, after the abnormality in the first system is detected;

transmit a second request that includes the data concerning securing the resources used to perform the first processing to a third information processing apparatus in the third system;

receive, from the first information processing apparatus, a notification representing that the first system has recovered and the first system performs the first processing; and transmit a third request to release the resources secured for the first system to the third information processing apparatus, upon receiving the notification.

* * * * *